United States Patent
Imai et al.

(10) Patent No.: US 12,362,406 B2
(45) Date of Patent: Jul. 15, 2025

(54) BATTERY SYSTEM

(71) Applicant: TOYOTA JIDOSHA KABUSHIKI KAISHA, Toyota (JP)

(72) Inventors: Shota Imai, Toyota (JP); Junichi Matsumoto, Toyota (JP); Tomoaki Toshijima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 729 days.

(21) Appl. No.: 17/663,870

(22) Filed: May 18, 2022

(65) Prior Publication Data
US 2022/0399585 A1    Dec. 15, 2022

(30) Foreign Application Priority Data

Jun. 11, 2021  (JP) .................................. 2021-097968

(51) Int. Cl.
*H01M 10/48* (2006.01)
*H01M 10/30* (2006.01)
*H01M 10/44* (2006.01)
*G01K 7/22* (2006.01)

(52) U.S. Cl.
CPC ......... *H01M 10/486* (2013.01); *H01M 10/30* (2013.01); *H01M 10/441* (2013.01); *G01K 7/22* (2013.01)

(58) Field of Classification Search
CPC .. H01M 10/486; H01M 10/30; H01M 10/441; H01M 10/482; H01M 10/425; H01M 10/4257; G01K 7/22; G01K 3/10; G01K 7/42; G01K 7/427; Y02E 60/10
See application file for complete search history.

(56) References Cited

U.S. PATENT DOCUMENTS

| | | | |
|---|---|---|---|
| 2011/0199053 A1* | 8/2011 | Minamiura | H01M 10/482 |
| | | | 320/136 |
| 2012/0081076 A1* | 4/2012 | Fujimura | H01M 10/486 |
| | | | 320/134 |
| 2018/0375178 A1* | 12/2018 | Yamauchi | H01M 10/486 |
| 2019/0296407 A1* | 9/2019 | Newman | H01M 10/6555 |

FOREIGN PATENT DOCUMENTS

| | | |
|---|---|---|
| JP | 2007-333453 A | 12/2007 |
| JP | 2010-108750 A | 5/2010 |
| WO | WO 2010/049795 A1 | 5/2010 |

* cited by examiner

*Primary Examiner* — Muhammad S Siddiquee
(74) *Attorney, Agent, or Firm* — Finnegan, Henderson, Farabow, Garrett and Dunner, LLP

(57) ABSTRACT

A battery system includes a battery module, thermistor, and ECU. The thermistor detects the temperature of a first area in the battery module. The ECU calculates the estimated temperature of a second area having a higher temperature than the first area in the battery module, by adding a temperature correction amount to a detected value of the thermistor. The ECU is configured to set the temperature correction amount according to a time differential value of the detected value. Then, the ECU sets the temperature correction amount such that the rate of increase of the estimated temperature of the second area does not exceed a predetermined rate that is larger than zero.

8 Claims, 13 Drawing Sheets

BATTERY SYSTEM

CROSS-REFERENCE TO RELATED APPLICATION

This application claims priority to Japanese Patent Application No. 2021-097968 filed on Jun. 11, 2021, incorporated herein by reference in its entirety.

BACKGROUND

1. Technical Field

The disclosure relates to a battery system.

2. Description of Related Art

Japanese Unexamined Patent Application Publication No. 2010-108750 (JP 2010-108750 A) discloses a battery pack input-output control system. The control system includes a battery pack, temperature sensor, voltage sensor, current sensor, and maximum temperature estimating unit. The battery pack consists of a plurality of unit cells assembled together. The temperature sensor detects the battery surface temperature. The voltage sensor detects the battery voltage of a unit cell of the battery pack. The current sensor detects the current input to and output from the battery pack. The maximum temperature estimating unit estimates the maximum temperature within the battery pack, using the detected values of the temperature sensor, voltage sensor, and current sensor.

SUMMARY

A battery module is known which includes a plurality of bipolar nickel-metal-hydride batteries. In the battery module, a temperature sensor that detects its temperature is provided. For structural reasons of the battery module consisting of the bipolar batteries, it may be difficult to install the temperature sensor in an area of the battery module as a target of temperature analysis (which will be referred to as "target area"). In this case, the temperature sensor is installed in an area different from the target area; therefore, the detected value of the temperature sensor normally does not coincide with the temperature of the target area. Thus, it is considered to estimate the temperature of the target area, using the detected value of the temperature sensor. Especially when the temperature of the target area is higher than the area where the temperature sensor is installed, it is important to properly estimate the temperature of the target area, with the objective of overheat protection of the battery module.

In this connection, the temperature sensor may be affected by noise, and its detected value may increase and largely deviate from the actual temperature of the area where the temperature sensor is installed. At the same time, the estimated temperature of the target area calculated using the detected value may also increase and largely deviate from the actual temperature of the same area. As a result, the temperature of the target area cannot be properly estimated.

The disclosure provides a battery system that consists of bipolar nickel-metal-hydride batteries, in which the temperature of a target area that is higher than that of an area where a temperature sensor is installed is properly estimated, according to the detected value of the temperature in the area.

The battery system of the disclosure includes a battery module, a temperature sensor, and a processor. The battery module includes a plurality of bipolar nickel-metal-hydride batteries. The temperature sensor detects a temperature of a first area in the battery module. The processor is configured to calculate an estimated temperature of a second area having a higher temperature than the first area in the battery module, by adding a temperature correction amount to a detected value of the temperature sensor. The processor is configured to set the temperature correction amount according to a time differential value of the detected value. Then, the processor is configured to set the temperature correction amount such that a rate of increase of the estimated temperature of the second area does not exceed a predetermined rate that is larger than zero.

With the above configuration, even when the detected value of the temperature sensor is affected by noise, to such an extent that the time differential value rapidly increases, the rate of increase of the estimated temperature of the second area is prevented from exceeding the predetermined rate. As a result, the estimated temperature of the second area can be made less likely or unlikely to increase so rapidly that it largely deviates from the actual temperature.

The processor may be configured to calculate a first estimated temperature of the second area, by adding a first correction amount of a positive value to the detected value, and calculate a second estimated temperature of the second area, by performing an annealing process for moderating change of the first estimated temperature, on the first estimated temperature. The processor may be configured to set the first correction amount as the temperature correction amount when the time differential value is a positive value. The processor may be configured to set a second correction amount that is larger than zero as the temperature correction amount when the time differential value is reduced from a positive value to a negative value, and calculate the second estimated temperature as the estimated temperature of the second area by adding the second correction amount to the detected value.

With the above configuration, when the time differential value of the detected value decreases from a positive value to a negative value, the estimated temperature of the second area changes from the first estimated temperature to the second estimated temperature that is larger than the detected value by the second correction amount. Thus, the estimated temperature of the second area can be made less likely or unlikely to largely deviate from the actual temperature as the estimated temperature of the second area drops sharply to the detected value.

When the detected value increases from a first value to a second value that is larger than the first value, the processor may be configured to calculate a third correction amount obtained by multiplying the time differential value by a predetermined constant, and set the third correction amount as the temperature correction amount at a time when the detected value is the second value, when an amount of increase from a fourth correction amount indicating the temperature correction amount at a time when the detected value is the first value to the third correction amount is smaller than a threshold amount. The processor may be configured to set a value obtained by adding a value that is smaller than the threshold amount to the fourth correction amount, as the temperature correction amount at the time when the detected value is the second value, when the amount of increase is equal to or larger than the threshold amount.

With the above configuration, even when the temperature sensor is affected by noise, to such an extent that the amount of increase becomes equal to or larger than the threshold amount, the temperature correction amount can be prevented from excessively increasing. As a result, the estimated temperature of the second area can be prevented from largely deviating from the actual temperature, due to an excessive rise of the estimated temperature of the second area caused by the influence of the noise.

The processor may be configured to obtain a sampled value of an output of the temperature sensor every sampling period, calculate the detected value for each predetermined period, using a plurality of sampled values over the predetermined period that is longer than the sampling period, calculate the estimated temperature of the second area from the detected value, for the above-indicated each predetermined period, and, when an absolute value of a difference between a last value and a current value of the sampled values is equal to or larger than a threshold value, calculate the detected value without using the current value.

With the above configuration, even when the current value of the sampled values takes an abnormal value such that the absolute value of a difference between the last value and the current value of the sampled values is equal to or larger than the threshold value, the processor calculates the detected value, without using the current value as the abnormal value. Thus, since the temperature correction amount is set according to the detected value, the estimated temperature of the second area is properly calculated. As a result, the estimated temperature of the second area can be prevented from changing so rapidly that it largely deviates from the actual temperature.

The processor may be configured to set the temperature correction amount such that the rate of increase of the estimated temperature of the second area does not exceed the predetermined rate, when a charging current of the battery module is equal to or larger than a predetermined threshold current.

With the above configuration, even when the detected value of the temperature sensor is affected by noise in the case where the charging current is excessively large, the temperature correction amount is set so that the rate of increase of the estimated temperature of the second area does not exceed the predetermined rate. As a result, during overcharging of the battery module, the estimated temperature of the second area can be made less likely or unlikely to increase so rapidly that it largely deviates from the actual temperature.

The battery system may further include a relay connected to the battery module. The processor may be configured to control the relay to an open state when the estimated temperature of the second area is increased to a threshold temperature.

With the above configuration, when the estimated temperature of the second area increases to the threshold temperature, charging or discharging in the battery module is stopped. Thus, the temperature of the second area can be prevented from rising to a level that exceeds the threshold temperature. As a result, the battery module can be protected from overheating due to charging or discharging.

In the battery system that consists of the bipolar nickel-metal-hydride batteries, the temperature of the target area that is higher than that of the area where the temperature sensor is installed can be properly estimated, according to the detected value of the temperature in the area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
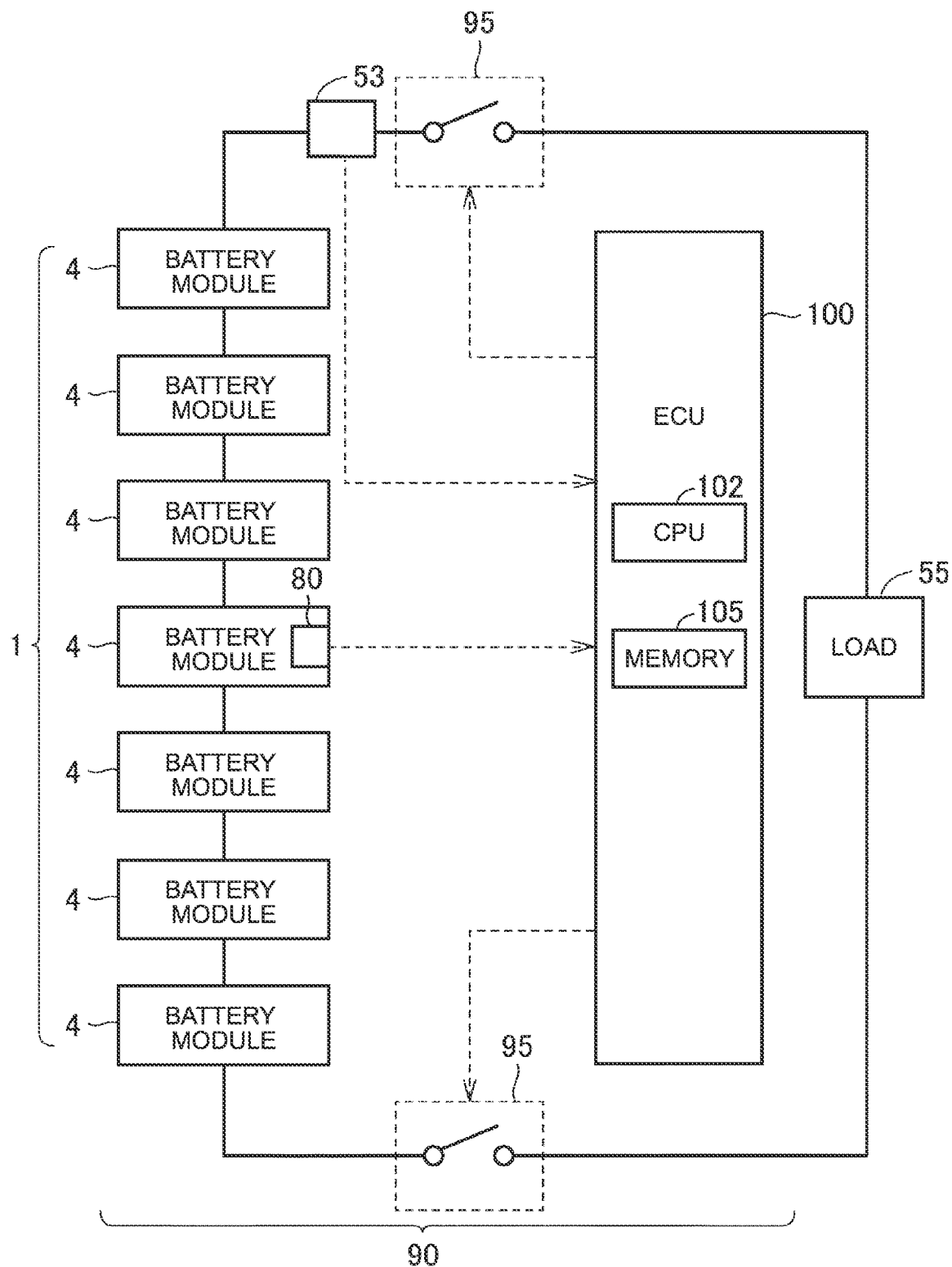
FIG. 1 is a view schematically showing the configuration of a battery system according to one embodiment.

Some embodiments of the disclosure will be described in detail with reference to the drawings. In the drawings, the same reference signs are assigned to the same or corresponding components or portions, of which description will not be repeated. The battery system of the disclosure is typically applied to vehicles, but may find applications other than vehicles.

First Embodiment

FIG. 1 schematically shows the configuration of a battery system according to a first embodiment. Referring to FIG. 1, the battery system 90 includes a battery unit 1, thermistor 80, system main relay (which will be referred to as "SMR") 95, current sensor 53, and electronic control unit (ECU) 100.

The battery unit 1 consists of a plurality of battery modules 4 stacked together. Each of the battery modules 4 includes bipolar nickel-metal-hydride batteries. While seven battery modules 4 are described in the example of FIG. 1, the number of the battery modules is not limited to this. A cooling plate (not shown) through which a coolant for cooling the battery modules 4 flows is provided between adjacent ones of the battery modules 4. The detailed configuration of the battery module 4 will be described later.

The thermistor 80 detects the temperature of an area in an end portion of the battery module 4. In this example, the thermistor 80 is provided in a typical battery module 4 (the middle module among the seven battery modules 4), among the plurality of battery modules 4. The thermistor 80 detects the temperature of an area in an end portion of the typical battery module, but may detect the temperature of other battery modules. The detected value of the thermistor 80 is obtained by the ECU 100. Other types of temperature sensors may be used in place of the thermistor 80.

The SMR 95 is connected to the battery modules 4 (the battery unit 1). The SMR 95 is provided as a switching device for switching between execution and stop of charging and discharging in the battery modules 4. The current sensor 53 detects the charge/discharge current of the battery modules 4 (the battery unit 1).

The ECU 100 includes a central processing unit (CPU) 102 and a memory 105. The CPU 102 performs various computations according to information stored in the memory 105, etc. The memory 105 includes a read only memory (ROM) and a random access memory (RAM) (both of which are not shown). The ROM stores programs, etc. to be executed by the CPU 102. The RAM temporarily stores data, etc. referred to by the CPU 102. The control of the ECU 100 may be realized by software processing, but may also be realized by hardware fabricated in the ECU 100.

The ECU 100 estimates the temperature of a target area in the battery module 4, according to each sensor signal (e.g., detected values of the thermistor 80 and the current sensor 53), and a program, data, map, etc. stored in the memory 105. In this embodiment, the temperature is estimated in the battery module 4 provided with the thermistor 80. The detected temperature and estimated temperature in the typical battery module 4 are deemed to be equal to the detected temperature and estimated temperature in the other battery modules 4, and used.

The ECU 100 obtains a sampled value of the output of the thermistor 80 every sampling period. By using a plurality of sampled values over a predetermined period that is longer than the sampling period, the ECU 100 calculates a detected value of the thermistor 80 for each predetermined period. Specifically, the ECU 100 calculates the average value of the sampled values over the predetermined period, as the detected value of the thermistor 80. The ECU 100 calculates the estimated temperature of the target area from the detected value, for each predetermined period.

When the estimated temperature of the target area of the thermistor 80 exceeds a threshold temperature, the ECU 100 controls the SMR 95 to the open state. The control performed by the ECU 100 will be described in detail later.

The battery system 90 is connected to a load 55. When the battery system 90 is installed on a vehicle, the load 55 is, for example, a power control unit (PCU), a motor, or the like.

Figure 2:
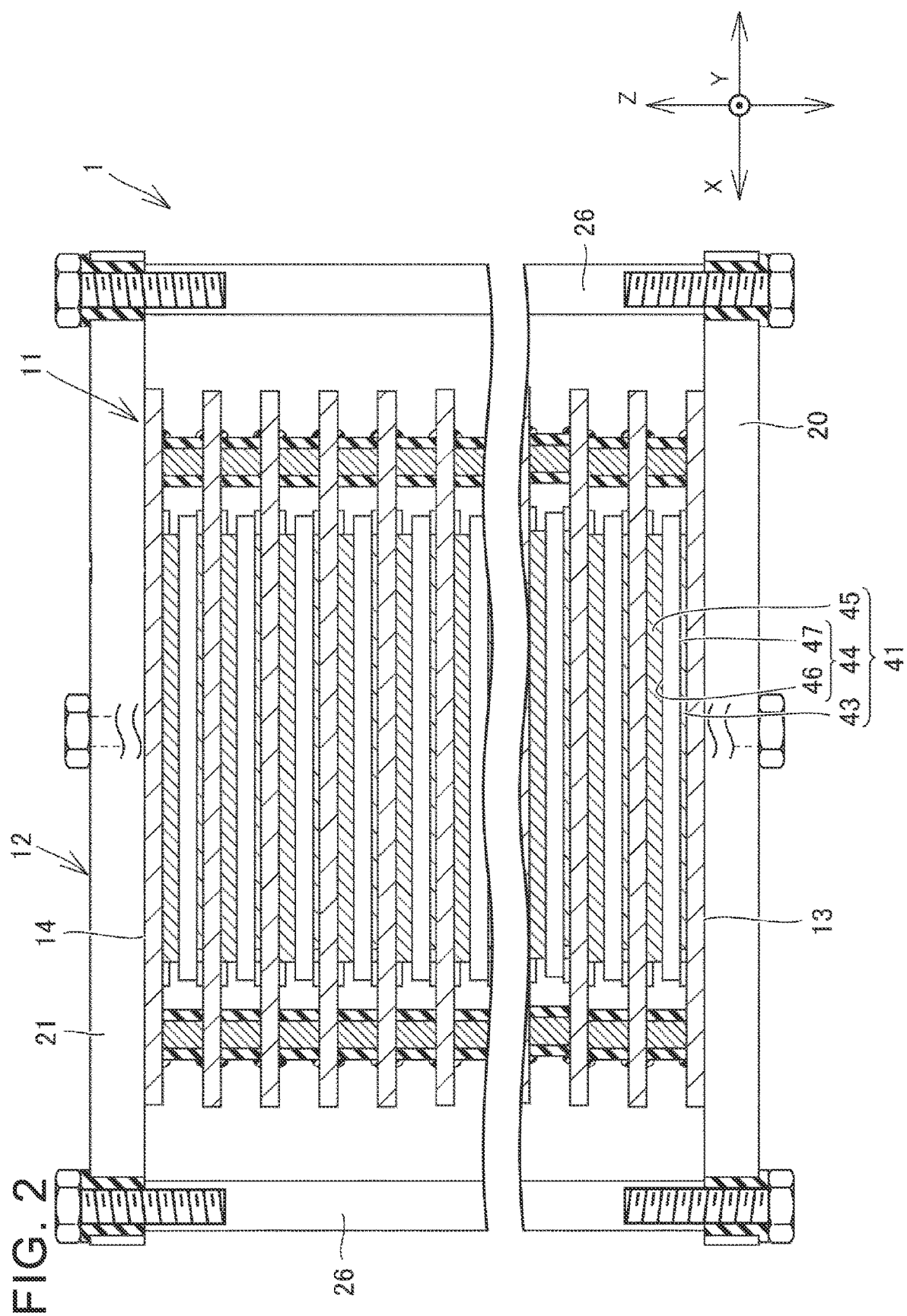
FIG. 2 is a cross-sectional view of a battery unit.
Figure 3:
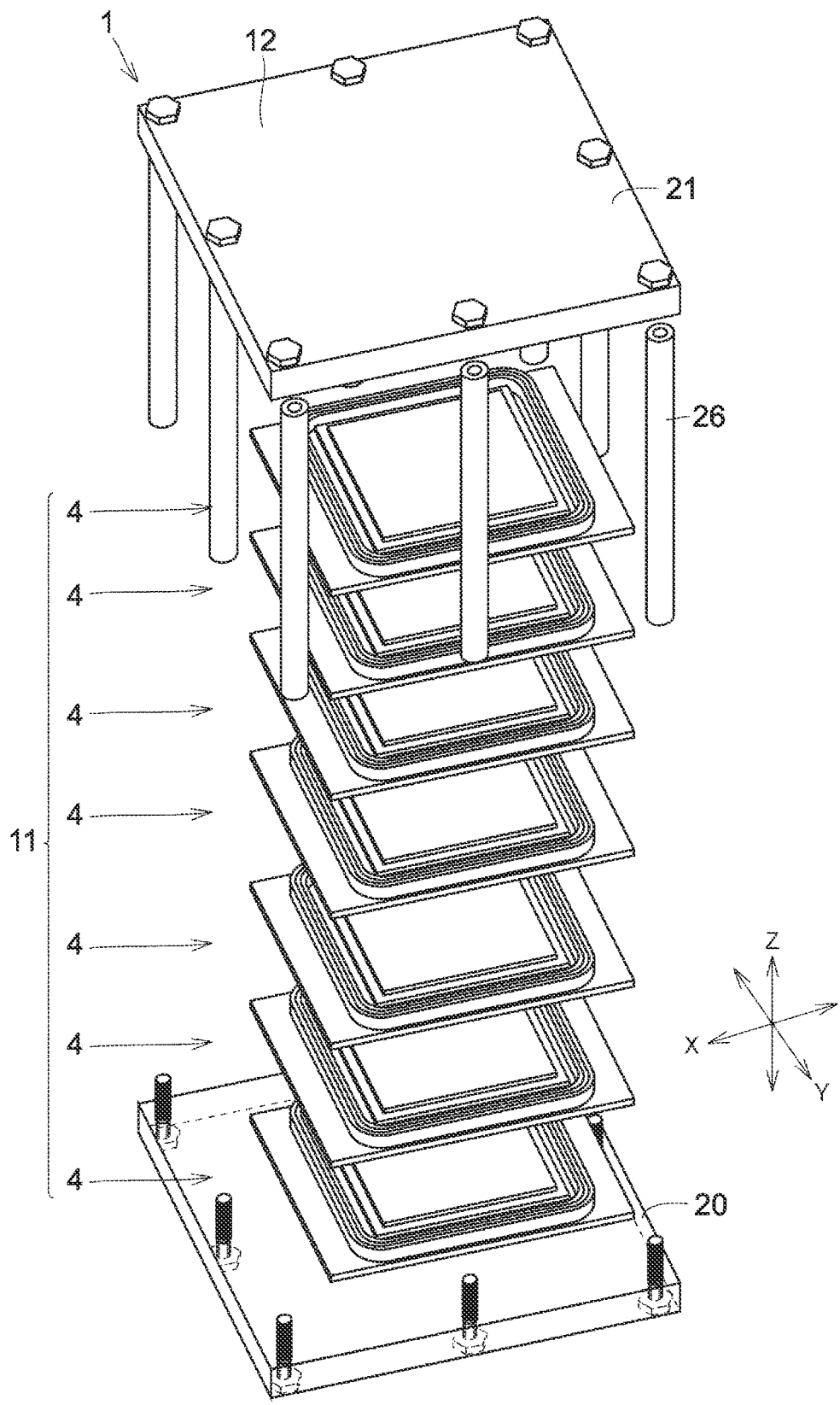
FIG. 3 is an exploded perspective view of the battery unit.

Referring to FIG. 2 and FIG. 3, the configuration of the battery unit 1 and battery module 4 will be described. FIG. 2 is a cross-sectional view of the battery unit 1. FIG. 3 is an exploded perspective view of the battery unit 1.

The battery unit 1 includes a stack 11 and a restraint 12. The stack 11 includes a plurality of battery modules 4. The battery modules 4 are stacked in a stacking direction Z. The stack 11 has an end face 13 and an end face 14 arranged in the stacking direction Z.

The battery module 4 includes a plurality of electrode layers 41. Each electrode layer 41 includes a separator 44, a negative electrode 45, and a positive electrode 43. The separator 44 has an upper surface 46 and a lower surface 47 arranged in the stacking direction Z. The negative electrode 45 is disposed on the upper surface 46. The positive electrode 43 is disposed on the lower surface 47.

The battery module 4 further includes a positive terminal electrode and a negative terminal electrode (both of which are not shown). Thus, in the battery module 4, the electrode layers 41 are disposed between the positive terminal electrode and the negative terminal electrode.

One battery cell is formed between adjacent ones of the electrode layers 41. Where "n" pieces of electrode layers (bipolar electrodes) 41 are provided in the battery module 4, a total of "n−1" pieces of battery cells are formed between the "n" pieces of electrode layers 41 ("n" is an integer). Also, one battery cell is formed between the electrode layer 41 adjacent to the positive terminal electrode, and the positive terminal electrode. One battery cell is formed between the electrode layer 41 adjacent to the negative terminal electrode, and the negative terminal electrode. Accordingly, the battery module 4 includes "n+1" pieces of battery cells formed in the stacking direction Z. Each battery cell is a bipolar nickel-metal-hydride battery.

The restraint 12 restrains the stack 11 in the stacking direction Z. The restraint 12 includes a pressure plate 20, a pressure plate 21, and a plurality of connecting shafts 26. The pressure plate 20 presses the end face 13. The pressure plate 21 presses the end face 14.

Each connecting shaft 26 is disposed between the pressure plate 20 and the pressure plate 21, and connects the pressure plate 20 and the pressure plate 21. The respective connecting shafts 26 are arranged at given intervals, to surround the periphery of the stack 11 (FIG. 3). The stack 11 is exposed to the outside air, and the heat of the battery modules 4 in the stack 11 is released to the outside air.

Figure 4:
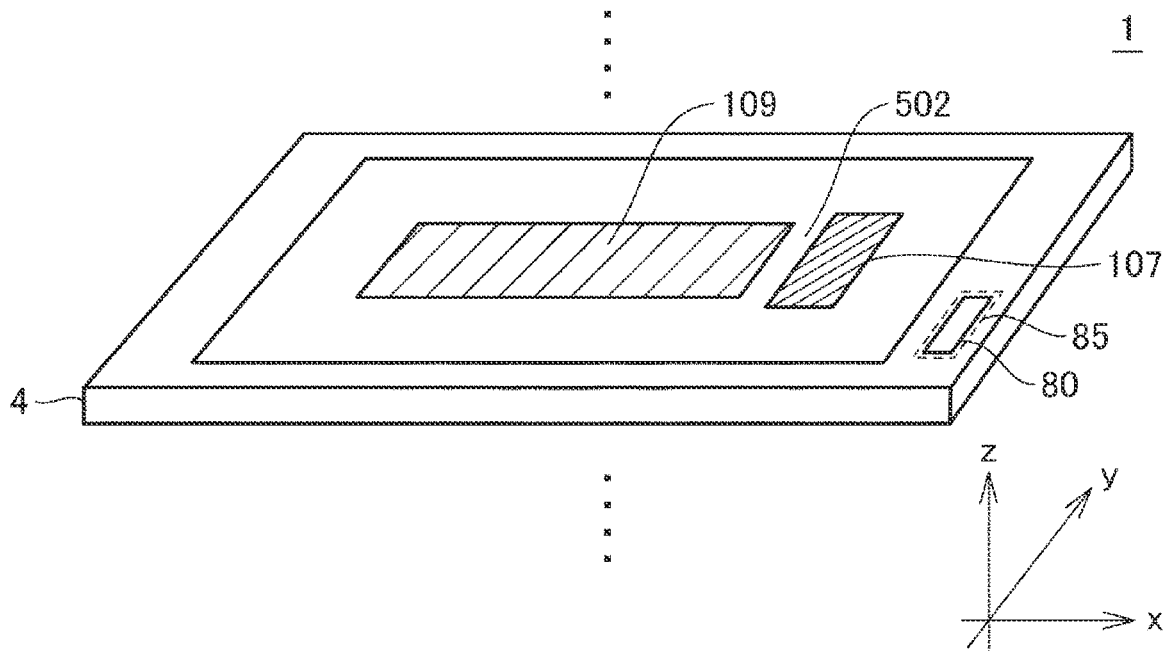
FIG. 4 is a view useful for explaining that, during use of the battery unit, the temperature of a target area in the vicinity of a thermistor becomes higher than the temperature of an area where the thermistor is installed.

FIG. 4 is a view useful for explaining that, during the use of the battery unit 1, the temperature of the target area in the vicinity of the thermistor 80 becomes higher than the temperature of the area in which the thermistor 80 is installed.

For some structural reasons of the battery module 4, it is not possible to install the thermistor 80 in the target area 107 as a target of temperature analysis in the battery module 4. Thus, the thermistor 80 is installed in an area 85 that is closest to the target area 107, among areas located outside a heat generation area 502 (rectangular area) in the battery module 4. In the example of FIG. 4, the area 85 is an area of an end portion of the battery module 4 when viewed in the stacking direction Z. During the use of the battery module 4, the temperature of the target area 107 (the heat generation area 502) is higher than that of the area 85.

Due to heat transfer from the target area 107 to the area 85 and the heat capacity of the thermistor 80, a rise in the temperature of the target area 107 is not immediately reflected by the detected value of the thermistor 80.

For this reason, the detected value of the thermistor 80 normally does not coincide with the temperature of the target area 107. Thus, it is considered to estimate the temperature of the target area 107 using the detected value of the thermistor 80.

In this embodiment, the ECU 100 calculates the estimated temperature of the target area 107, by adding a temperature correction amount to the detected value of the thermistor 80. More specifically, the ECU 100 calculates the estimated temperature TN(t) of the target area 107 at time t, according to the detected value TD(t) of the thermistor 80 and the temperature correction amount CA(t), using the following equation (1).

$$TN(t)=TD(t)+CA(t) \quad (1)$$

The ECU 100 is configured to set the temperature correction amount CA(t), according to a time differential value of the detected value TD(t) of the thermistor 80.

When the temperature of the target area 107 is higher than that of the area 85, as in the example of FIG. 4, it is important to properly estimate the temperature of the target area 107, with the objective of overheat protection of the battery module 4.

Here, the thermistor 80 is sometimes affected by noise (for example, high-frequency noise such as Bulk Current Injection (BCI) noise generated from an external radio). As a result, the detected value of the thermistor 80 may increase and largely deviate from the actual temperature of the area 85. More specifically, the current flowing in the thermistor 80 is influenced by a magnetic field generated due to the noise. Thus, the thermistor 80 produces heat, and the detected value of the thermistor 80 increases and largely deviates from the actual temperature of the area 85. Thus, the estimated temperature of the target area 107 calculated according to the detected value of the thermistor 80 also increases and largely deviates from the actual temperature of the target area 107. As a result, the temperature of the target area 107 cannot be properly estimated.

The battery system 90 according to this embodiment includes an arrangement for solving the above problem. Specifically, the ECU 100 sets the temperature correction amount CA(t) so that the time rate of increase of the estimated temperature TN(t) of the target area 107 does not exceed a predetermined rate (rate guard value) that is larger than zero. This process is also called "rate guard process".

With the rate guard process executed, the estimated temperature TN(t) can be made less likely or unlikely to rapidly increase and largely deviate from the actual temperature of the target area 107 due to the influence of noise. In the following, a method of calculating the estimated temperature TN(t) will be described in detail.

The provisional estimated temperature of the target area 107 at time t is denoted as TNP(t). The provisional estimated temperature TNP(t) is used for calculation of the estimated temperature TN(t) according to Eq. (1). In the first embodiment, the above rate guard process is performed on the provisional estimated temperature TNP(t), so that the estimated temperature TN(t) is calculated. The provisional estimated temperature TNP(t) is the sum of a provisional temperature correction amount (which will be described later) and the detected value TD(t).

The actual temperature of the area 85 where the thermistor 80 is installed at time t is denoted as TT1(t). The actual temperature of the target area 107 at time t is denoted as TT2(t). W denotes the amount of heat transfer between the target area 107 and the area 85, and C denotes the heat conductivity. The heat capacity of the thermistor 80 is denoted as a. The calculation interval (constant value) of the detected value of the thermistor 80 by the ECU 100 is denoted as Δt. In this case, the following equations (2), (3) are established.

$$W=C \times (TT2(t)-TT1(t)) \quad (2)$$

$$TD(t)=TD(t-\Delta t) \pm (W/\alpha) \times \Delta t \quad (3)$$

Here, the heat capacity α and the heat conductivity C are constants that are determined in advance by experiment. The second term on the right side in Eq. (3) represents the amount of increase of the temperature of the thermistor 80 during Δt, which is caused by the amount of heat transfer W.

Where TT1(t)=TD(t), TT2(t)=TNP(t), and (WC) is a constant K, the following equation (4) is derived from the above equations (1), (2).

$$TNP(t)=TD(t)+((TD(t)-TD(t-\Delta t))/\Delta t) \times K=TD(t)+TDD$$
$$(t) \times K=TD(t)+CAP(t) \quad (CAP(t) \geq 0) \quad (4)$$

In the above equation (4), TDD(t) is a time differential value of TD(t). CAP(t) is a provisional temperature correction amount for the detected value TD(t) of the thermistor 80. The provisional temperature correction amount CAP(t) is used for calculation of the temperature correction amount CA(t) in Eq. (1). The provisional temperature correction amount CAP(t) is set to be equal to or larger than zero. When the differential value TDD(t) is reduced from a positive value to zero, the provisional temperature correction amount CAP(t) is set to be equal to a value immediately before the differential value TDD(t) is reduced to zero. When the differential value TDD(t) is reduced from a positive value to a negative value, the provisional temperature correction amount CAP(t) is set to zero.

The ECU 100 is configured to set the temperature correction amount CA(t), by using Eq. (1) and Eq. (4) above. For example, when the rate of increase of the provisional estimated temperature TNP(t) does not exceed a predetermined rate, the ECU 100 does not perform the rate guard process. Thus, the ECU 100 sets the provisional temperature correction amount CAP(t) as the temperature correction amount CA(t) (CA(t)=CAP(t)). As a result, the provisional estimated temperature TNP(t) is used as the estimated temperature TN(t) (TN(t)=TNP(t)).

On the other hand, when the rate of increase of the provisional estimated temperature TNP(t) exceeds the predetermined rate, the ECU 100 performs the rate guard process. In this case, the ECU 100 does not set the provisional temperature correction amount CAP(t) itself as the temperature correction amount CA(t). As a result, the provisional estimated temperature TNP(t) itself is not used as the estimated temperature TN(t). Thus, through execution of the rate guard process, the estimated temperature TN(t) can be made less likely or unlikely to rapidly increase and largely deviate from the actual temperature of the target area 107 due to the noise. In this embodiment, when the rate of increase of the provisional estimated temperature TNP(t) exceeds the predetermined rate, the ECU 100 performs the rate guard process so that the rate of increase of the estimated temperature TN(t) becomes equal to the predetermined rate.

Figure 5:
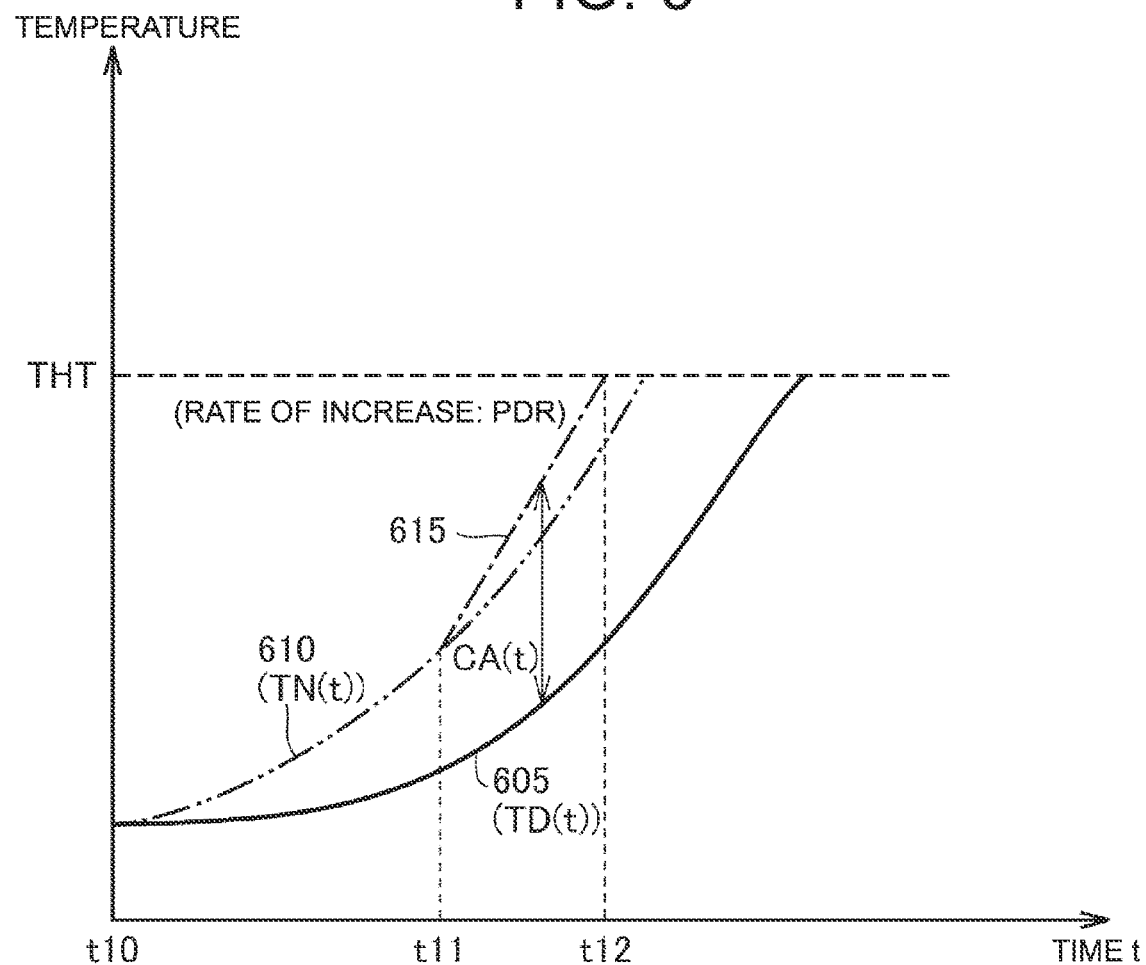
FIG. 5 is a graph showing changes in the detected value of the thermistor and the estimated temperature of the target area with time when the battery module is overcharged.

FIG. 5 is a graph showing changes in the detected value TD(t) of the thermistor 80 and the estimated temperature TN(t) of the target area 107 with time, when the battery module 4 is overcharged. In FIG. 5, the horizontal axis indicates the time, and the vertical axis indicates the temperature.

The phrase "the battery module 4 is overcharged" refers to the case where the charging current of the battery module 4 is equal to or larger than a predetermined threshold current. The threshold current is suitably determined in advance by experiment, or the like, so as to protect the battery module 4 from overheating. When the battery module 4 is overcharged, the temperature of the target area 107 in the heat generation area 502 (FIG. 4) is likely to rise particularly rapidly. It is particularly effective for the ECU 100 to calculate the estimated temperature TN(t) (execute the rate guard process), using Eq. (1) and Eq. (4), when the temperature of the target area 107 is likely to rise particularly rapidly. The ECU 100 can determine whether the battery module 4 is overcharged, according to the detected value of the current sensor 53 (FIG. 1).

In FIG. 5, line 605 indicates changes in the detected value TD(t) of the thermistor 80 with time. Line 610 indicates changes in the estimated temperature TN(t) of the target area 107 with time, when the thermistor 80 is not affected by noise. Line 615 indicates changes in the estimated temperature TN(t) of the target area 107 with time, when the thermistor 80 is affected by noise.

At time t10, charging is started in the battery module 4, so that the temperature of the battery module 4 starts rising. After time t10, the detected value TD(t) of the thermistor 80 (line 605) does not coincide with the estimated temperature TN(t) of the target area 107 (line 610). Specifically, as shown in FIG. 5, when the battery module 4 is overcharged, the estimated temperature TN(t) increases faster than the detected value TD(t) of the thermistor 80. It is experimentally known that the actual temperature of the target area 107 increases faster than the detected value TD(t). Thus, the estimated temperature TN(t) of the target area 107 properly reflects the actual temperature of the target area 107.

At time t11, the detected value TD(t) of the thermistor 80 starts being affected by noise. As a result, the rate of increase of the provisional estimated temperature TNP(t) calculated according to the detected value TD(t) of the thermistor 80 using Eq. (4) exceeds the predetermined rate PDR (rate guard value). Then, the ECU 100 sets the temperature correction amount CA(t) so that the rate of increase of the estimated temperature TN(t) becomes equal to the predetermined rate PDR (line 615). Namely, after time t11, the estimated temperature TN(t) is represented by line 615. The predetermined rate PDR is set based on the rate of increase (the rate of increase of line 610 after time t11) that would be taken during overcharging if the thermistor 80 was not affected by noise. For example, the predetermined rate PDR is set to the maximum value of the above-indicated rate of increase. Thus, during overcharging of the battery module 4, the estimated temperature TN(t) can be prevented from increasing to a level at which it largely deviates from the actual temperature of the target area 107, due to the influence of the noise.

At time t12, the estimated temperature TN(t) of the target area 107 reaches the threshold temperature THT. At this time, the ECU 100 switches the SMR 95 from the closed state to the open state so as to protect the battery modules 4 from overheating. The threshold temperature THT is a value for protecting the battery module 4 from overheating, and is suitably determined in advance by experiment, or the like. As the SMR 95 is switched to the open state, charging in the battery module 4 is stopped. Thus, the estimated temperature TN(t) of the target area 107 can be prevented from increasing to a level equal to or higher than the threshold temperature THT. As a result, the battery module 4 can be protected from overheating due to overcharging.

Figure 6:
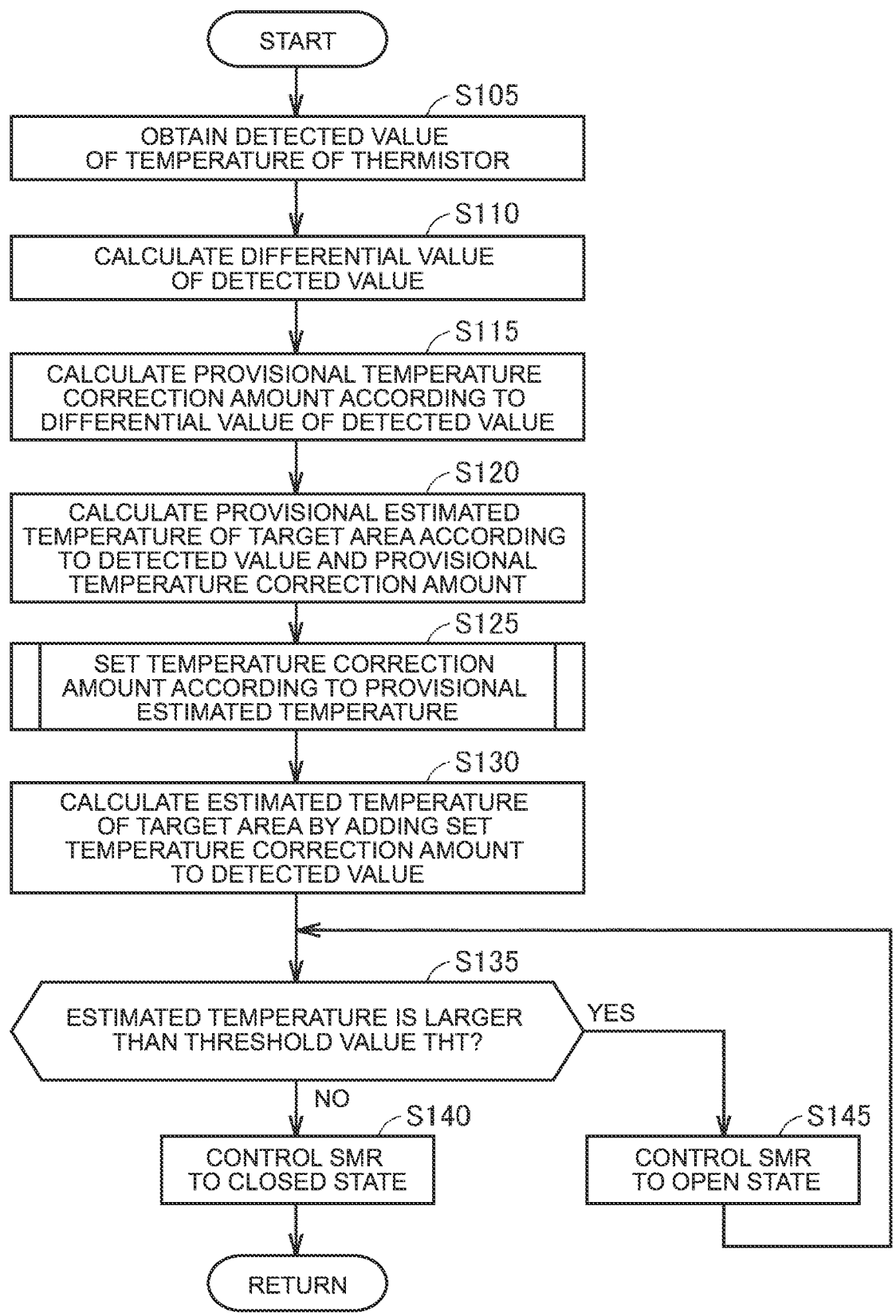
FIG. 6 is a flowchart showing an example of a control routine associated with calculation of the estimated temperature of the target area.

FIG. 6 is a flowchart showing an example of a control routine associated with calculation of the estimated temperature TN(t) of the target area 107. The control routine of this flowchart is executed at predetermined time intervals during running of a system for driving the vehicle in which the battery system 90 is installed (while the start switch of the vehicle is ON).

Referring to FIG. 6, the ECU 100 calculates the detected value TD(t) of the thermistor 80 (step S105). Specifically, by using a plurality of sampled values over a predetermined period that is longer than the sampling period, the ECU 100 calculates the detected value corresponding to the predetermined period. The ECU 100 calculates the differential value TDD(t) of the detected value TD(t) (step S110).

The ECU 100 calculates the provisional temperature correction amount CAP(t) (=TDD(t)×K) in Eq. (4), according to the differential value TDD(t) of the detected value TD(t) (step S115). The ECU 100 calculates the provisional estimated temperature TNP(t) of the target area 107, according to the detected value TD(t) and the provisional temperature correction amount CAP(t), using Eq. (4) (step S120).

The ECU 100 sets the temperature correction amount CA(t), according to the provisional estimated temperature TNP(t) (step S125). The setting method will be described in detail later.

The ECU 100 calculates the estimated temperature TN(t) of the target area 107 by adding the set temperature correction amount CA(t) to the detected value TD(t) according to Eq. (1) (step S130).

In step S135, the ECU 100 determines whether the estimated temperature TN(t) is equal to or higher than the threshold temperature THT. When the estimated temperature TN(t) is lower than the threshold temperature THT (NO in step S135), the ECU 100 controls the SMR 95 to the closed state (step S140). Then, the control returns in a condition where charging or discharging of the battery unit 1 is continued.

On the other hand, when the estimated temperature TN(t) is equal to or higher than the threshold temperature THT (YES in step S135), the ECU 100 controls the SMR 95 to the open state (step S145). The ECU 100 controls the SMR 95 to the open state, until the estimated temperature TN(t) is reduced to be lower than the threshold temperature THT (until a negative decision (NO) is obtained in step S135).

Figure 7:
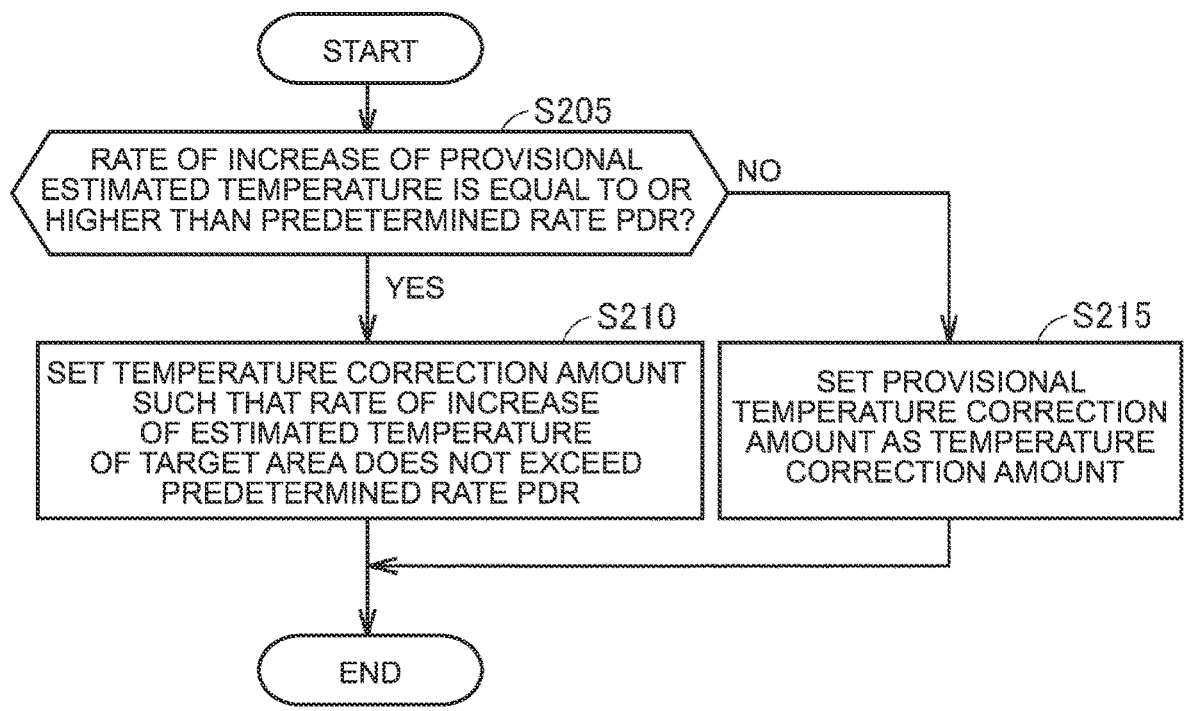
FIG. 7 is a flowchart useful for describing details of a process for setting a temperature correction amount according to a provisional estimated temperature.

FIG. 7 is a flowchart useful for describing details of operation (step S125 of FIG. 6) to set the temperature correction amount CA(t) according to the provisional estimated temperature TNP(t).

Referring to FIG. 7, the ECU 100 determines whether the rate of increase of the provisional estimated temperature TNP(t) is equal to or higher than the predetermined rate PDR (step S205). When the rate of increase of the provisional estimated temperature TNP(t) is equal to or higher than the predetermined rate PDR (YES in step S205), the ECU 100 sets the temperature correction amount CA(t) so that the rate of increase of the estimated temperature TN(t) of the target area 107 does not exceed the predetermined rate PDR (step S210). In this case, the provisional temperature correction amount CAP(t) is not used as the temperature correction amount CA(t). Specifically, the ECU 100 sets the temperature correction amount CA(t) so that the rate of increase of the estimated temperature TN(t) becomes equal to the predetermined rate PDR.

On the other hand, when the rate of increase of the provisional estimated temperature TNP(t) is lower than the predetermined rate PDR (NO in step S205), the ECU 100 sets the provisional temperature correction amount CAP(t) as the temperature correction amount CA(t) (step S215). After execution of step S210 or step S215, the ECU 100 finishes the process of FIG. 7, and proceeds to step S130 of FIG. 6.

As described above, the ECU 100 according to this embodiment calculates the estimated temperature TN(t) of the target area 107 by adding the temperature correction amount CA(t) to the detected value TD(t) of the thermistor 80. The ECU 100 is configured to set the temperature correction amount CA(t) according to the time differential value TDD(t) of the detected value TD(t) of the thermistor 80. The ECU 100 sets the temperature correction amount CA(t) so that the time rate of increase of the estimated temperature TN(t) of the target area 107 does not exceed the predetermined rate PDR that is larger than zero.

With the above configuration, even when the detected value TD(t) of the thermistor 80 is affected by noise to such an extent that the differential value TDD(t) rapidly increases, the rate of increase of the estimated temperature TN(t) of the target area 107 is prevented from exceeding the predetermined rate PDR. As a result, the estimated temperature TN(t) of the target area 107 can be made less likely or unlikely to increase so rapidly that it largely deviates from the actual temperature. As a result, the temperature of the target area 107 can be properly estimated, according to the detected value TD(t) of the thermistor 80.

Furthermore, the SMR 95 is controlled to the open state at an appropriate point in time (time t12 in the example of FIG. 5) when the estimated temperature TN(t) reaches the threshold temperature THT. Namely, the battery module 4 can be made less likely or unlikely to be protected excessively or to be insufficiently protected from overheating; thus, the battery module 4 can be appropriately protected.

Furthermore, in this embodiment, the respective detected values of the current sensor and the voltage sensor are not required for calculation of the estimated temperature TN(t) by the ECU 100. Namely, the ECU 100 can calculate the estimated temperature TN(t) of the target area 107 according to the detected value TD(t) of the thermistor 80, without using the current and voltage input to or output from the battery module 4.

Second Embodiment

In the second embodiment, the case where the differential value TDD(t) of the detected value TD(t) is reduced from a positive value to a negative value will be described. Specifically, the ECU 100 performs an annealing process on the estimated temperature of the target area 107 obtained by a calculation method before the differential value TDD(t) is reduced to a negative value. Then, the ECU 100 calculates the temperature after the annealing process is performed, as the estimated temperature TN(t) of the target area 107 after the differential value TDD(t) is reduced to the negative value. The annealing process is a gradual changing process including averaging and lagging. The configuration and control routine of the battery system in the second embodiment are basically the same as those of the battery system 90 in the first embodiment as shown in FIG. 1 to FIG. 6.

Figure 8:
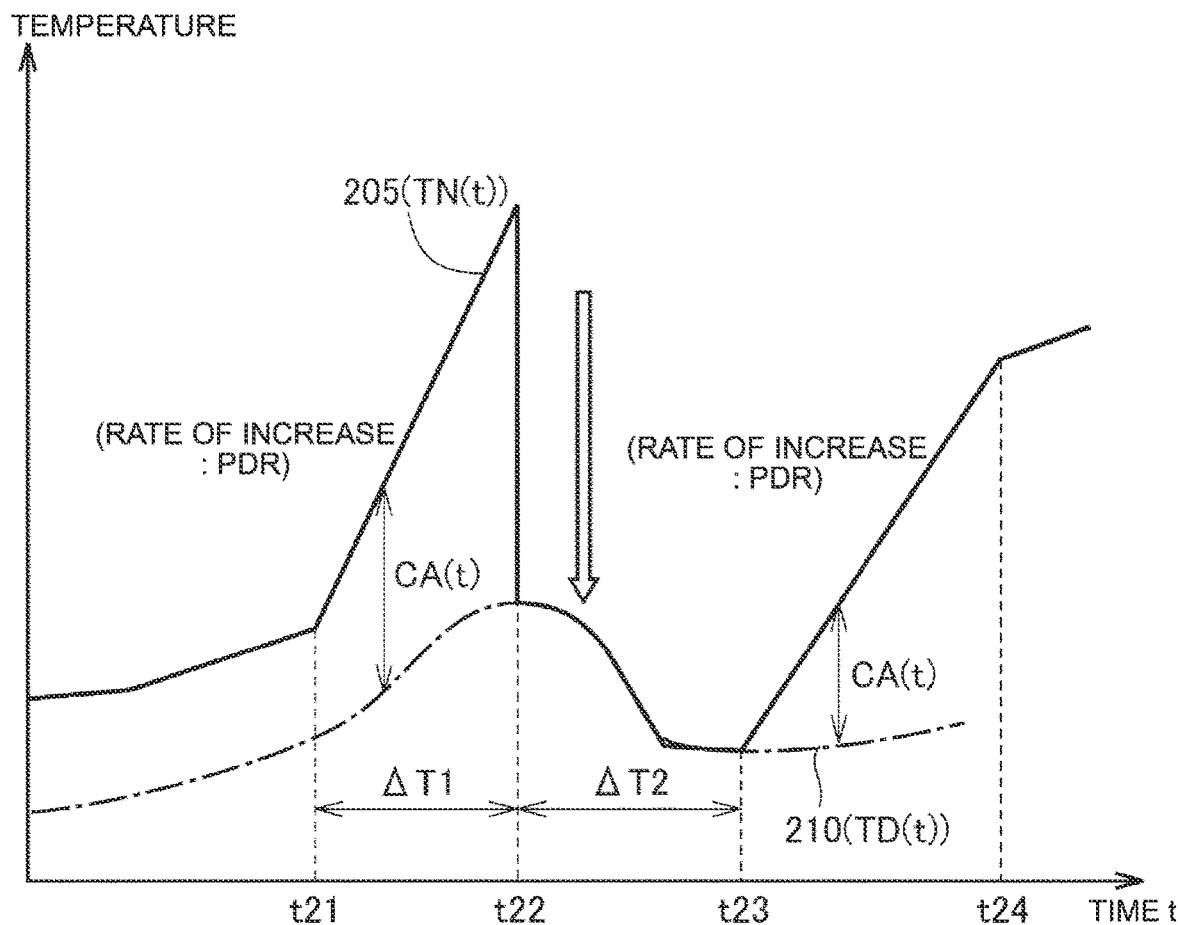
FIG. 8 is a graph showing an example of changes in the detected value of the thermistor and a first estimated temperature of the target area with time.

Referring to FIG. 8, a comparative example of the second embodiment will be described. FIG. 8 is a graph showing an example of changes in the detected value TD(t) of the thermistor 80 and a first estimated temperature of the target area 107 with time. The first estimated temperature is calculated according to the detected value TD(t) using Eq. (1) and Eq. (4) above, under the condition that the rate of increase of the estimated temperature TN(t) does not exceed the predetermined rate PDR (the rate guard value), and has not been subjected to the annealing process. In FIG. 8, the horizontal axis indicates the time, and the vertical axis indicates the temperature.

Line 210 indicates changes in the detected value TD(t) of the thermistor 80 with time. Line 205 indicates changes in the first estimated temperature of the target area 107.

At time t21, the detected value TD(t) of the thermistor 80 starts being affected by noise. The ECU sets the temperature correction amount CA(t) so that the rate of increase of the estimated temperature TN(t) does not exceed the predetermined rate PDR (line 205). The increase of the temperature continues for a period ΔTE During the period, the thermistor 80 is affected by noise. Thus, the detected value TD(t) of the thermistor 80 is higher than the actual temperature of the area 85.

At time t22, the detected value TD(t) stops increasing. Then, the differential value TDD(t) of the detected value TD(t) decreases from a positive value to a negative value. As a result, the estimated temperature TN(t) drops sharply to the detected value TD(t) of the thermistor 80 (line 205), as will be described below.

The temperature correction amount CA(t), which is set based on the provisional temperature correction amount CAP(t), depends on the differential value TDD(t) of the detected value TD(t) (Eq. (1), Eq. (4)). In Eq. (4) above, when the differential value TDD(t) is reduced to a negative value, the provisional temperature correction amount CAP(t) is set to zero. Therefore, during a period ΔT2 in which the detected value TD(t) is reduced, the temperature correction amount CA(t) is set to zero (CA(t)=CAP(t)=0). Hence, the estimated temperature TN(t) of the target area 107 becomes equal to the detected value TD(t) of the thermistor 80 (Eq. (1)). For this reason, at time t22, the estimated temperature TN(t) of the target area 107 drops sharply to the detected value TD(t) of the thermistor 80.

However, the estimated temperature TN(t) of the target area 107 does not properly reflect the actual temperature of the target area 107, because it is hardly possible that the actual temperature of the target area 107 drops as sharply as shown in FIG. 8. Thus, the phenomenon of the sharp drop (change) of the estimated temperature TN(t) is not desirable from the viewpoint of the accuracy of the estimated temperature TN(t).

At time t23, the influence of noise on the thermistor 80 is eliminated, and the detected value TD(t) of the thermistor 80 starts increasing again (line 210). As the detected value TD(t) increases, the differential value TDD(t) of the detected value TD(t) becomes a positive value. As a result, the temperature correction amount CA(t) calculated according to the differential value TDD(t) also becomes a positive value.

During the period from time t23 to time t24, the rate of increase of the provisional estimated temperature TNP(t) is assumed to be equal to or higher than the predetermined rate PDR. Thus, the ECU sets the temperature correction amount CA(t) so that the rate of increase of the estimated temperature TN(t) does not exceed the predetermined rate PDR (in other words, the ECU limits the rate of increase of the estimated temperature TN(t) to the predetermined rate PDR). As a result, it takes time for the estimated temperature TN(t) of the target area 107 to properly reflect the actual temperature (reach the actual temperature).

As described above, the comparative example shown in FIG. 8 has the problem of reduction in the accuracy of the estimated temperature TN(t) of the target area 107 (time t22 to time t24), and the problem that it takes time for the estimated temperature TN(t) to properly reflect the actual temperature again after the detected value TD(t) is no longer affected by noise (time t23 to time t24).

Figure 9:
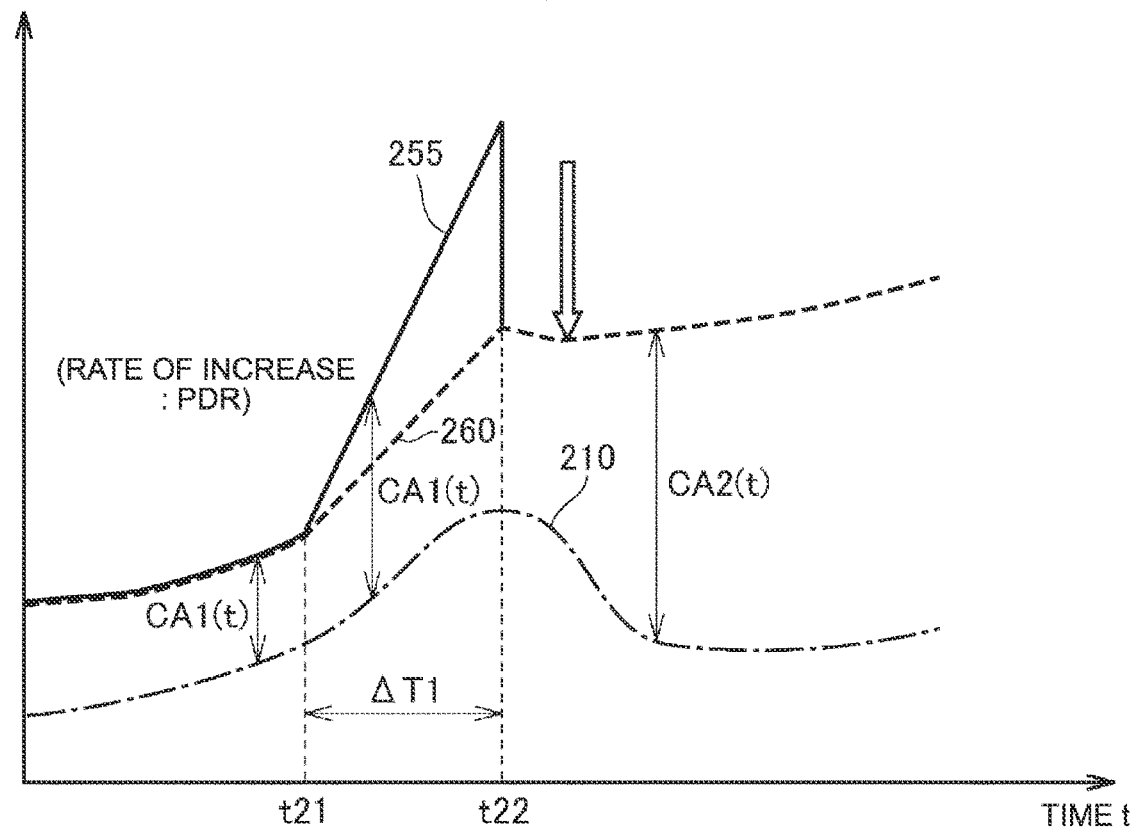
FIG. 9 is a graph showing an example of changes in the detected value of the thermistor and the estimated temperature of the target area with time, in a second embodiment.

FIG. 9 is a graph showing an example of changes in the detected value TD(t) of the thermistor 80 and the estimated temperature TN(t) of the target area 107 with time, in the second embodiment.

Referring to FIG. 9, line 255 indicates changes in the first estimated temperature of the target area 107 with time. Line 260 indicates changes in a second estimated temperature of the target area 107 with time. The second estimated temperature is calculated by performing the annealing process on the first estimated temperature so as to moderate change of the first estimated temperature.

The time constant of the annealing process is determined based on the approximate period of generation of noise (e.g., the sum of the length of the period ΔT1 and the length of the period ΔT2 in FIG. 8). As one example, the time constant is smaller than this sum and larger than zero. With the time constant thus determined, the second estimated temperature of the target area 107 properly reflects the actual temperature of the target area 107.

At time t21, the detected value TD(t) of the thermistor 80 starts being affected by noise, as in the case of FIG. 8. The first estimated temperature indicating the estimated temperature TN(t) of the target area 107 starts increasing so that its rate of increase does not exceed the predetermined rate PDR (line 255). In the second embodiment, when the differential value TDD(t) is a positive value (until time t22), the ECU 100 sets a correction amount CA1($t$) of a positive value as the temperature correction amount CA(t). The ECU 100 calculates the first estimated temperature as the estimated temperature TN(t) of the target area 107, by adding the correction amount CA1($t$) to the detected value TD(t) of the thermistor 80. Here, the ECU 100 calculates the second estimated temperature (line 260) as well as the first estimated temperature. Namely, while the first estimated temperature is used as the estimated temperature TN(t) of the target area 107 during the period prior to time t22, the second estimated temperature is also calculated.

At time t22, the detected value TD(t) of the thermistor 80 stops increasing (line 210). Then, the differential value TDD(t) of the detected value TD(t) decreases from a positive value to a negative value. Accordingly, the estimated temperature TN(t) of the target area 107 drops sharply.

After time t22, the second estimated temperature is used instead of the first estimated temperature, as the estimated temperature TN(t) of the target area 107 (line 260). Specifically, the ECU 100 sets a correction amount CA2($t$) that is larger than zero as the temperature correction amount CA(t). The ECU 100 calculates the second estimated temperature as the estimated temperature TN(t) of the target area 107, by adding the correction amount CA2($t$) to the detected value TD(t) of the thermistor 80. Thus, since the second estimated temperature is used as the estimated temperature TN(t) after time t22, the estimated temperature TN(t) of the target area 107 is reduced down to the second estimated temperature at time t22. Thus, the estimated temperature TN(t) drops sharply at time t22, like the estimated temperature (line 205 of FIG. 8) in the case of the comparative example, but it is not reduced down to the detected value TD(t) of the thermistor 80 (line 210), unlike the case of the comparative example.

After time t22, the estimated temperature TN(t) of the target area 107 (the second estimated temperature) rises without having its rate of increase limited to the predetermined rate PDR. The estimated temperature TN(t) of the target area 107 is considered to properly reflect the actual temperature of the target area 107 when it does not rise so rapidly. Thus, in the second embodiment, the accuracy of the estimated temperature TN(t) is improved, as compared with the case of the comparative example (time t22 to time t24 in FIG. 8). Also, in the second embodiment, it does not take time for the estimated temperature TN(t) of the target area 107 to properly reflect the actual temperature after dropping sharply, unlike the case of the comparative example (time t23 to time t24 in FIG. 8).

Figure 10:
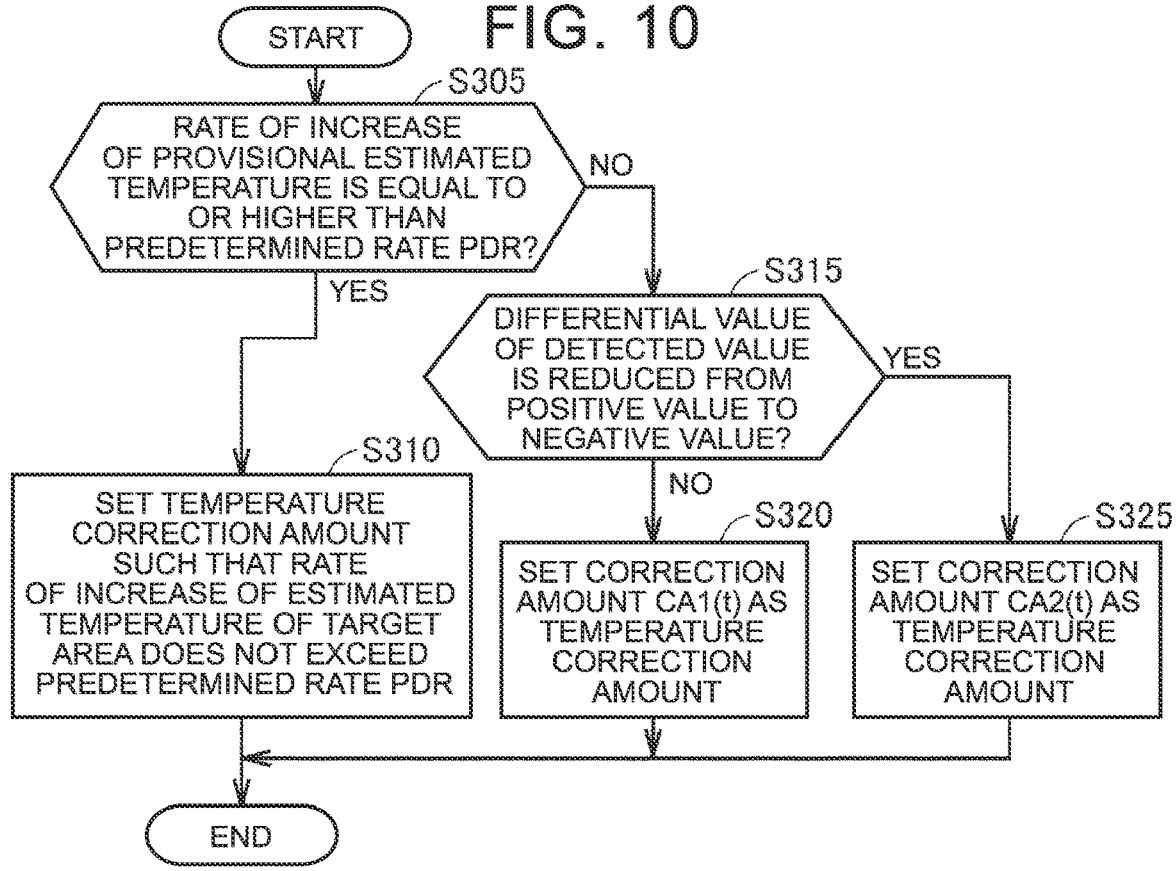
FIG. 10 is a flowchart showing an example of a process performed by an electronic control unit (ECU) according to the second embodiment.

FIG. 10 is a flowchart showing an example of a process performed by the ECU 100 according to the second embodiment. This flowchart is different from the flowchart of FIG. 7 in that step S215 (FIG. 7) is replaced with steps S315, S320, S325. Steps S305 and S310 in the flowchart of FIG. 10 are substantially the same as steps S205 and S210 of FIG. 7, respectively.

Referring to FIG. 10, when the rate of increase of the provisional estimated temperature TNP(t) is lower than the predetermined rate PDR (NO in step S305), the ECU 100 determines whether the differential value TDD(t) of the detected value TD(t) of the thermistor 80 is reduced from a positive value to a negative value (step S315). When the differential value TDD(t) is not reduced from a positive value to a negative value (NO in step S315), the ECU 100 sets the correction amount CA1($t$) as the temperature correction amount CA(t) (step S320). As described above, the correction amount CA1($t$) is set before time t22 in FIG. 9. On the other hand, when the differential value TDD(t) is reduced from a positive value to a negative value (YES in step S315), the ECU 100 sets the correction amount CA2($t$) as the temperature correction amount CA(t) (step S325). As described above, the correction amount CA2($t$) is set after time t22 in FIG. 9. After execution of step S320 or step S325, the ECU 100 finishes the process of FIG. 10, and proceeds to step S130 of FIG. 6.

As described above, the ECU 100 according to the second embodiment calculates the first estimated temperature of the target area 107, by adding the correction amount CA1($t$) of the positive value to the detected value TD(t), and calculates the second estimated temperature of the target area 107, by performing the annealing process for moderating change of the first estimated temperature, on the first estimated temperature. When the differential value TDD(t) is a positive value, the ECU 100 sets the correction amount CA1($t$) as the temperature correction amount CA(t). When the differential value TDD(t) is reduced from a positive value to a negative value, the ECU 100 sets the correction amount CA2($t$) that is larger than zero, as the temperature correction amount CA(t), and calculates the second estimated temperature as the estimated temperature TN(t) of the target area 107, by adding the correction amount CA2($t$) to the detected value TD(t).

With the above configuration, as the differential value TDD(t) decreases from a positive value to a negative value, the estimated temperature TN(t) of the target area 107 changes from the first estimated temperature to the second estimated temperature that is higher than the detected value TD(t) by the correction amount CA2($t$). Thus, the estimated temperature TN(t) of the target area 107 can be made less likely or unlikely to largely deviate from the actual temperature due to a sharp drop of the estimated temperature TN(t) of the target area 107 down to the detected value TD(t).

Third Embodiment

In the third embodiment, the case where the amount of increase of the provisional temperature correction amount CAP(t) (=TDD(t)×K)) is equal to or larger than a threshold amount that is larger than zero. In this case, it is not desirable that the temperature correction amount CA(t) is set to an excessively large value, and thus the estimated temperature TN(t) is calculated to be an excessively high and unrealistic value. Thus, in the third embodiment, the temperature correction amount CA(t) is set so as to avoid this situation. This point will be described in detail below. The configuration and control routine of the battery system according to the third embodiment are basically the same as those of the battery system 90 in the first embodiment as shown in FIG. 1 to FIG. 6.

Figure 11:
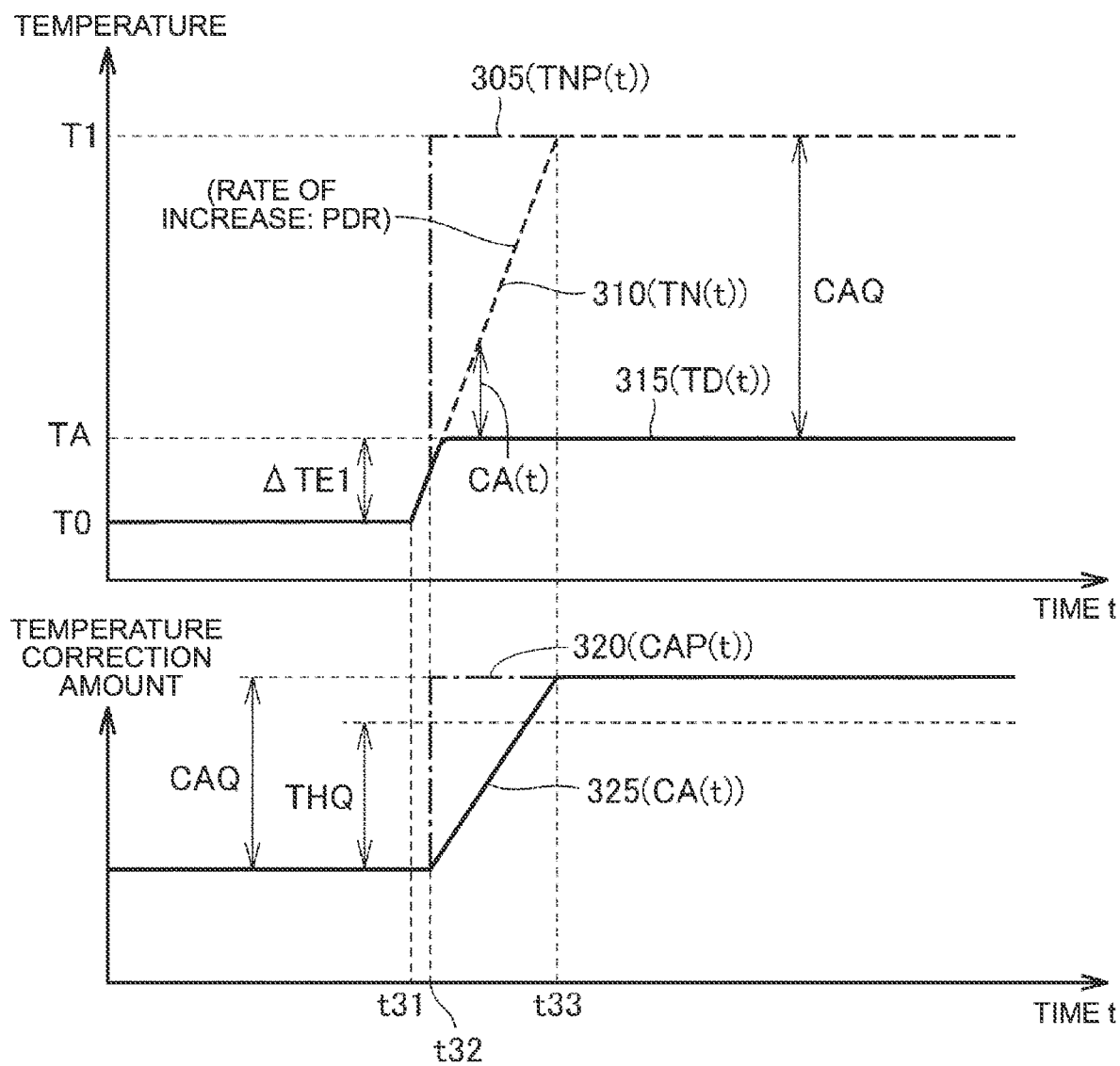
FIG. 11 is a graph showing an example of changes in the detected value of the thermistor, provisional estimated temperature of the target area, and estimated temperature of the target area with time.

Initially, referring to FIG. 11, a comparative example to the third embodiment will be described. FIG. 11 is a graph showing an example of changes in the detected value TD(t) of the thermistor 80, the provisional estimated temperature TNP(t) of the target area 107, and the estimated temperature TN(t) of the target area 107 with time. In FIG. 11, the horizontal axis indicates the time, and the vertical axis indicates the temperature.

Line 315 indicates changes in the detected value TD(t) of the thermistor 80 with time. Line 305 indicates changes in the provisional estimated temperature TNP(t) calculated using Eq. (4). Line 310 indicates changes in the estimated temperature TN(t) of the target area 107 with time. Line 320 indicates changes in the provisional temperature correction amount CAP(t) calculated using Eq. (4). Line 325 indicates changes in the temperature correction amount CA(t) with time. After time t33 (which will be described later), lines 320, 325 coincide with each other.

At time t31, the detected value TD(t) of the thermistor 80 starts increasing from temperature T0 because it starts being affected by noise (line 315).

At time t32, the provisional estimated temperature TNP(t) rises sharply due to the influence of the noise (line 305). In the example of FIG. 11, the time rate of increase of the provisional estimated temperature TNP(t) exceeds the predetermined rate PDR (the rate guard value). Therefore, during the period between time t32 and time t33, the ECU sets the temperature correction amount CA(t) so that the rate of increase of the estimated temperature TN(t) does not exceed the predetermined rate PDR (lines 310, 325).

At time t33, the temperature correction amount CA(t) and the estimated temperature TN(t) stop increasing. At this time, the estimated temperature TN(t) is equal to temperature T1. After time t33, the detected value TD(t) of the thermistor 80 (temperature TA) is increased to be higher by ΔTE1 than temperature T0 measured before the thermistor 80 is affected by noise (before time t31). Also, the temperature correction amount CA(t) is increased by the amount of increase CAQ.

In the example of FIG. 11, during charging of the battery module 4, the detected value TD(t) of the thermistor 80 increases by ΔTE1 due to noise during the period between time t31 and time t33. Namely, the actual temperature of the target area 107 does not increase by ΔTE1.

As the detected value TD(t) rapidly increases by ΔTE1, the provisional temperature correction amount CAP(t) calculated based on the detected value TD(t) also rapidly increases (line 320). The amount of increase CAQ of the provisional temperature correction amount CAP(t) is equal to or larger than a threshold amount THQ. The threshold amount THQ is suitably determined in advance by experiment, or the like, such that the situation where the amount of increase CAQ becomes equal to or larger than the threshold amount THQ is deemed unrealistic. Thus, when the amount of increase CAQ of the provisional temperature correction amount CAP(t) is equal to or larger than the threshold amount THQ, as shown in FIG. 11, it is considered that the actual temperature in the target area 107 does not rapidly rise, but the thermistor 80 is affected by noise.

However, in the comparative example of FIG. 11, the temperature correction amount CA(t) is calculated on the assumption that the provisional temperature correction amount CAP(t) is increased by the unrealistic amount of increase CAQ, and the estimated temperature TN(t) is calculated. As a result, the estimated temperature TN(t) rises excessively to unrealistic temperature T1 (line 310). Thus, in the comparative example of FIG. 11, the estimated temperature TN(t) of the target area 107 does not properly reflect the actual temperature of the target area 107. Accordingly, the ECU cannot properly calculate the estimated temperature TN(t).

In the third embodiment, the ECU 100 determines whether the thermistor 80 is affected by noise, depending on whether the amount of increase CAQ of the provisional temperature correction amount CAP(t) is equal to or larger than the threshold amount THQ. When the amount of increase CAQ is equal to or larger than the threshold amount THQ, the ECU 100 restricts the amount of increase of the provisional temperature correction amount CAP(t), so that the provisional temperature correction amount CAP(t) increases by an amount of increase that is smaller than the threshold amount THQ. Then, the temperature correction amount CA(t) is set according to the restricted amount of increase. Thus, the temperature correction amount CA(t) can be made less likely or unlikely to be set to an excessively large value. As a result, the estimated temperature TN(t) can be made less likely or unlikely to rise to the unrealistic temperature T1. In the following, this point will be described in detail.

Figure 12:
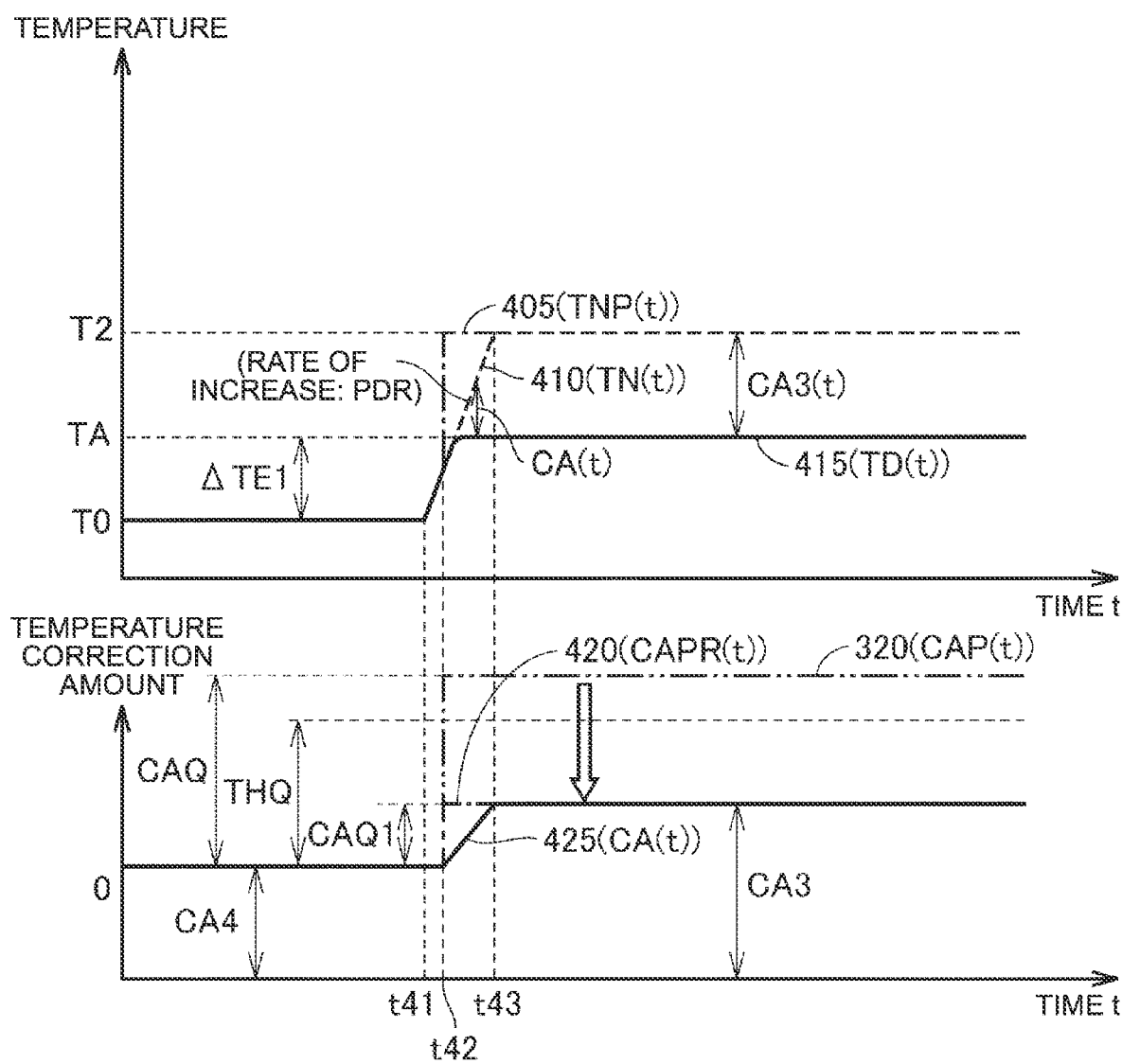
FIG. 12 is a graph showing an example of changes in the detected value of the thermistor, provisional estimated temperature of the target area, and estimated temperature of the target area with time, in a third embodiment.

Referring to FIG. 12, a process performed by the ECU 100 according to the third embodiment will be described. FIG. 12 is a graph showing an example of changes in the detected value TD(t) of the thermistor 80, the provisional estimated temperature TNP(t) of the target area 107, and the estimated temperature TN(t) of the target area 107, with time, in the third embodiment. In FIG. 12, the horizontal axis indicates the time, and the vertical axis indicates the temperature.

Line 415 indicates changes in the detected value TD(t) of the thermistor 80 with time. Line 405 indicates changes in the provisional estimated temperature TNP(t) calculated using Eq. (4) with time. Line 410 indicates changes in the estimated temperature TN(t) of the target area 107 with time. Line 420 indicates changes in the provisional temperature correction amount (which will be described later) of which the amount of increase is restricted as compared with the provisional temperature correction amount CAP(t). Line 425 indicates changes in the temperature correction amount CA(t) with time according to the third embodiment. After time t43 (which will be described later), lines 420, 425 coincide with each other.

At time t41, the detected value TD(t) of the thermistor 80 starts increasing from temperature T0 because it starts being affected by noise (line 415).

At time t42, the amount of increase CAQ of the provisional temperature correction amount CAP(t) becomes equal to or larger than the threshold amount THQ due to the influence of the noise. Thus, the ECU 100 determines that the thermistor 80 is affected by noise. Then, the ECU 100 limits the amount of increase of the provisional temperature correction amount CAP(t) to CAQ1 (<CAQ) (line 420). The amount of increase CAQ1 is smaller than the threshold amount THQ and larger than zero. For example, the amount of increase CAQ1 is obtained by dividing the amount of increase CAQ by a predetermined number that is larger than one. The provisional temperature correction amount obtained after the amount of increase is restricted is denoted as CAPR(t). In this embodiment, the provisional temperature correction amount CAPR(t) is used in place of the provisional temperature correction amount CAP(t) in Eq. (1) and Eq. (4).

At time t42, the time rate of increase of the provisional estimated temperature TNP(t) calculated based on the provisional temperature correction amount CAPR(t) exceeds the predetermined rate PDR (the rate guard value) (line 405). Thus, during the period between time t42 and time t43, the ECU 100 sets the temperature correction amount CA(t) while increasing it, such that the rate of increase of the estimated temperature TN(t) does not exceed the predetermined rate PDR (lines 410, 425).

At time t43, the amount of increase of the temperature correction amount CA(t) from time t42 reaches the amount of increase CAQ1. After time t43, the ECU 100 sets the correction amount CA3 (constant value) as the temperature correction amount CA(t), and does not increase the temperature correction amount CA(t). As a result, the estimated temperature TN(t) becomes equal to temperature T2 that is smaller than temperature T1 in the case of the comparative example (FIG. 11) (line 410). Here, the detected value TD(t) of the thermistor 80 is increased by ΔTE1 from before the thermistor 80 is affected by noise (before time t41), as in the case of the comparative example (FIG. 11). On the other hand, the ECU 100 sets the temperature correction amount CA(t) such that it is increased by the amount of increase CAQ1 from before time t41, unlike the comparative example. Namely, the correction amount CA3 set after time t42 at which the amount of increase CAQ of the provisional temperature correction amount CAP(t) becomes equal to or larger than the threshold amount THQ is the sum of the correction amount CA4 set before time t42, and the amount of increase CAQ1 (line 425).

Figure 13:
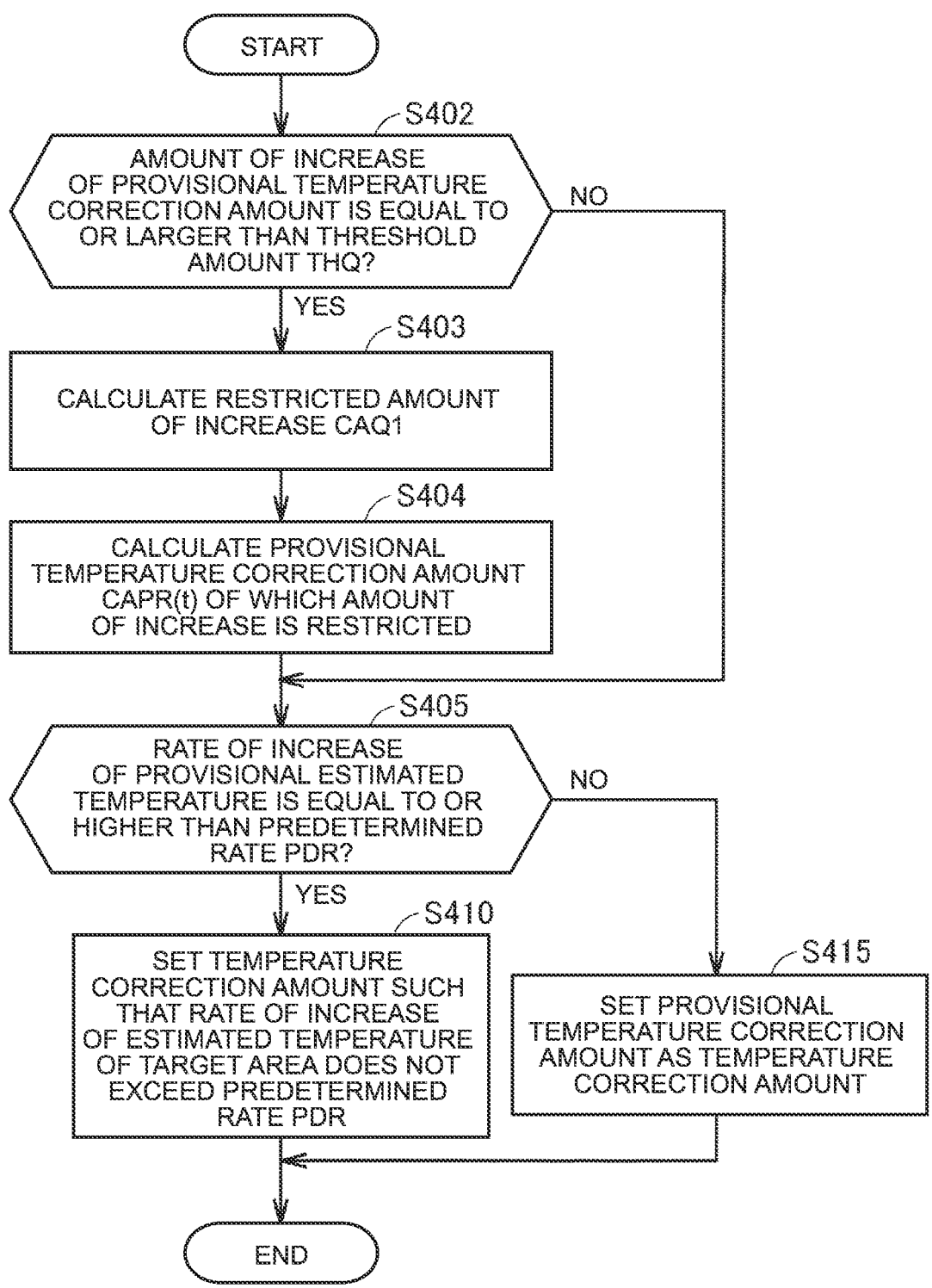
FIG. 13 is a flowchart showing an example of a process performed by the ECU according to the third embodiment.

FIG. 13 is a flowchart illustrating an example of a process performed by the ECU 100 according to the third embodiment. This flowchart corresponds to the detailed process of step S125 of FIG. 6, in the third embodiment. In the flowchart of FIG. 13, steps S402, S403, and S404 are added, as compared with the flowchart of FIG. 7. Steps S405, S410, and S415 in the flowchart of FIG. 13 are substantially the same as steps S205, S210, and S215 of FIG. 7, respectively.

Referring to FIG. 13 along with FIG. 12, the ECU 100 determines whether the amount of increase CAQ of the provisional temperature correction amount CAP(t) is equal to or larger than the threshold amount THQ (step S402). When the amount of increase CAQ of the provisional temperature correction amount CAP(t) is equal to or larger than the threshold amount THQ (YES in step S402), the ECU 100 calculates the restricted amount of increase CAQ1 (step S403), and calculates the provisional temperature correction amount CAPR(t) of which the amount of increase is restricted, according to the amount of increase CAQ1 and the correction amount CA4 before the increase (step S404). In the following steps, the provisional temperature correction amount CAPR(t) of which the amount of increase is restricted is used in place of the provisional temperature correction amount CAP(t). After execution of step S404, the ECU 100 proceeds to step S405. On the other hand, when the amount of increase CAQ of the provisional temperature correction amount CAP(t) is smaller than the threshold amount THQ (NO in step S402), the ECU 100 proceeds to step S405, without restricting the amount of increase of the provisional temperature correction amount CAP(t).

Step S405 and subsequent steps are executed in a similar manner to the case of the first embodiment (FIG. 7). Specifically, when the rate of increase of the provisional estimated temperature TNP(t) calculated according to the provisional temperature correction amount CAP(t) (or the provisional temperature correction amount CAPR(t)) is equal to or higher than the predetermined rate PDR (YES in step S405), the ECU 100 sets the temperature correction amount CA(t) so that the rate of increase of the provisional estimated temperature TNP(t) of the target area 107 does not exceed the predetermined rate PDR (step S410). If not (NO in step S405), the ECU 100 sets the provisional temperature correction amount CAP(t) (or the provisional temperature correction amount CAPR(t)) as the temperature correction amount CA(t) (step S415). After execution of step S410 or step S415, the ECU 100 finishes the process of FIG. 13, and proceeds to step S130 of FIG. 6.

As described above, in this embodiment, when the detected value TD(t) increases from temperature T0 to temperature TA, the ECU 100 calculates the provisional temperature correction amount CAP(t) obtained by multiplying the differential value TDD(t) by the predetermined constant K. When the amount of increase CAQ from the correction amount CA4 indicating the temperature correction amount CA(t) at the time when the detected value TD(t) is equal to temperature T0 to the provisional temperature correction amount CAP(t) is smaller than the threshold amount THQ, the ECU 100 sets the provisional temperature correction amount CAP(t) as the temperature correction amount CA(t) at the time when the detected value TD(t) is equal to temperature TA. On the other hand, when the amount of increase CAQ is equal to or larger than the threshold amount THQ, the ECU 100 sets the correction amount CA3 obtained by adding the amount of increase CAQ1 that is smaller than the threshold amount THQ to the correction amount CA4, as the temperature correction amount CA(t) at the time when the detected value TD(t) is equal to temperature TA.

Thus, when the thermistor 80 is affected by noise to such an extent that the amount of increase CAQ of the provisional temperature correction amount CAP(t) becomes equal to or larger than the threshold amount THQ, the temperature correction amount CA(t) can be prevented from being set to an excessively large value. Accordingly, the estimated temperature TN(t) of the target area 107 can be prevented from increasing excessively to the unrealistic temperature T1 (line 410), unlike the case of the comparative example of FIG. 11 (line 310).

Fourth Embodiment

In the fourth embodiment, when the absolute value of a difference between the last value and the current value of the sampled values obtained from the thermistor 80 is equal to or larger than a threshold value, the ECU 100 calculates the detected value TD(t) without using the current value. The configuration and control routine of the battery system in the fourth embodiment are basically the same as those of the battery system 90 in the first embodiment shown in FIG. 1 to FIG. 6.

Figure 14:
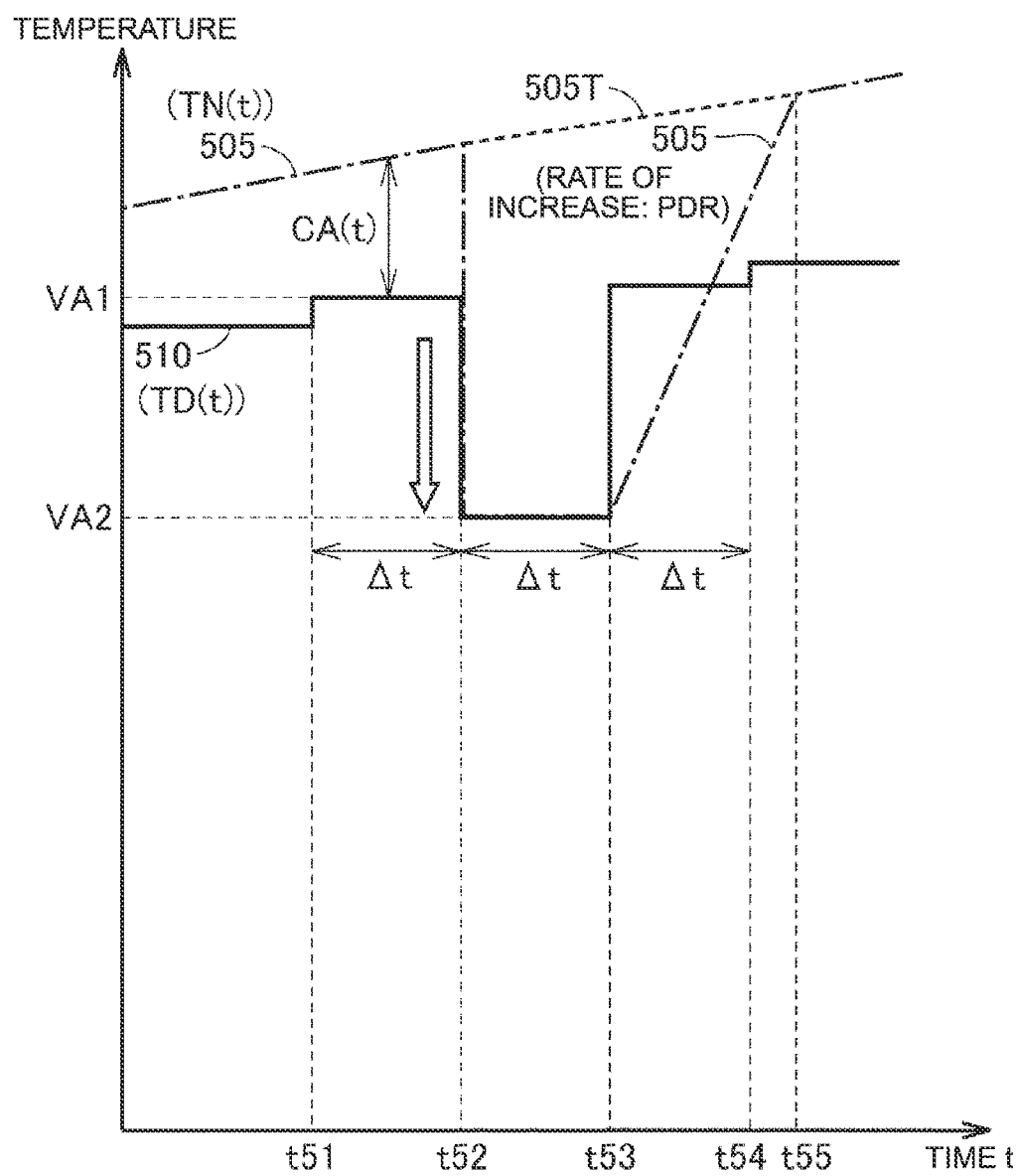
FIG. 14 is a graph showing changes in the detected value of the thermistor and the estimated temperature of the target area, when sampled values from the thermistor include an abnormal value.

Initially, referring to FIG. 14, a comparative example to the fourth embodiment will be described. FIG. 14 is a graph showing changes in the detected value TD(t) of the thermistor 80 and the estimated temperature TN(t) of the target area 107 with time, when the sampled values from the thermistor 80 include an abnormal value. In FIG. 14, the horizontal axis indicates the time, and the vertical axis indicates the atmosphere.

Line 510 indicates changes in the detected value TD(t) of the thermistor 80 with time. Line 505 indicates changes in the estimated temperature TN(t) of the target area 107 with time. Line 505T indicates changes in the temperature considered as the actual temperature of the target area 107 with time. As described above, Δt is the calculation interval of the detected values of the thermistor 80 by the ECU 100.

The ECU 100 obtains the sampled value from the thermistor 80 every predetermined sampling period. The sampling period is shorter than the detection period having the length of Δt. The ECU 100 calculates the average value of two or more (for example, a predetermined number of) sampled values over the detection period having the length of Δt, as the detected value TD(t) of the next detection period.

For example, the ECU 100 calculates the average value of the sampled values obtained in the detection period between time t51 and time t52. Then, the average value is used for calculation of the estimated temperature TN(t), as the detected value TD(t) in the detection period between time t52 and time t53 (line 505).

In the example of FIG. 14, at least one of the sampled values obtained over the detection period between time t51 and time t52 is an abnormal value. The "abnormal value" is a value to which the sampled value (the last value) immediately before the value in question is sampled is changed, by a predetermined threshold value or more. The abnormal value is not caused by the actual temperature change of the area 85 of the thermistor 80, but is caused by unexpected erroneous detection of the thermistor 80, for example. Thus, since the sampled values in the period from time t51 to time t52 includes the absolute value, the detected value TD(t) as the average value of the sampled values in this period drops sharply to VA2 (<VA1) at time t52.

Thus, at time t52, the differential value TDD(t) (=(VA2−VA1)/Δt) of the detected value TD(t) is reduced to a negative value. As described above, when the differential value TDD(t) is reduced to a negative value, the temperature correction amount CA(t) is set to zero. Thus, during the period from time t52 to time t53, the temperature correction amount CA(t) is set to zero. As a result, the estimated temperature TN(t) drops sharply to be equal to the detected value TD(t) of the thermistor 80 (line 505).

Thus, the phenomenon of the sudden change of the estimated temperature TN(t) is considered to be unrealistic. Thus, during the period from time t52 to time t53, the estimated temperature TN(t) is not considered to properly reflect the actual temperature of the target area 107.

During the period from time t53 to time t54, the ECU calculates the estimated temperature TN(t) of the target area 107 by using the average value of the sampled values obtained over the last period (the period from time t52 to time t53), as the detected value TD(t) of the current period (line 505). The above sampled values are not assumed to include any absolute value. Then, during the period from time t53 to time t54, the rate of increase of the provisional estimated temperature TNP(t) is assumed to exceed the predetermined rate PDR. Thus, the ECU sets the temperature correction amount CA(t), so that the rate of increase of the estimated temperature TN(t) is limited to the predetermined rate PDR (the rate guard value). As a result, it takes time for the estimated temperature TN(t) of the target area 107 to properly reflect the actual temperature (line 505T) (to reach the actual temperature).

As described above, in the comparative example of FIG. 14, the sampled values obtained during the period from time t51 to time t52 include an absolute value. Therefore, during the period from time t52 to time t55, the estimated temperature TN(t) of the target area 107 cannot properly reflect the temperature (line 505T) considered as the actual temperature of the target area 107.

Figure 15:
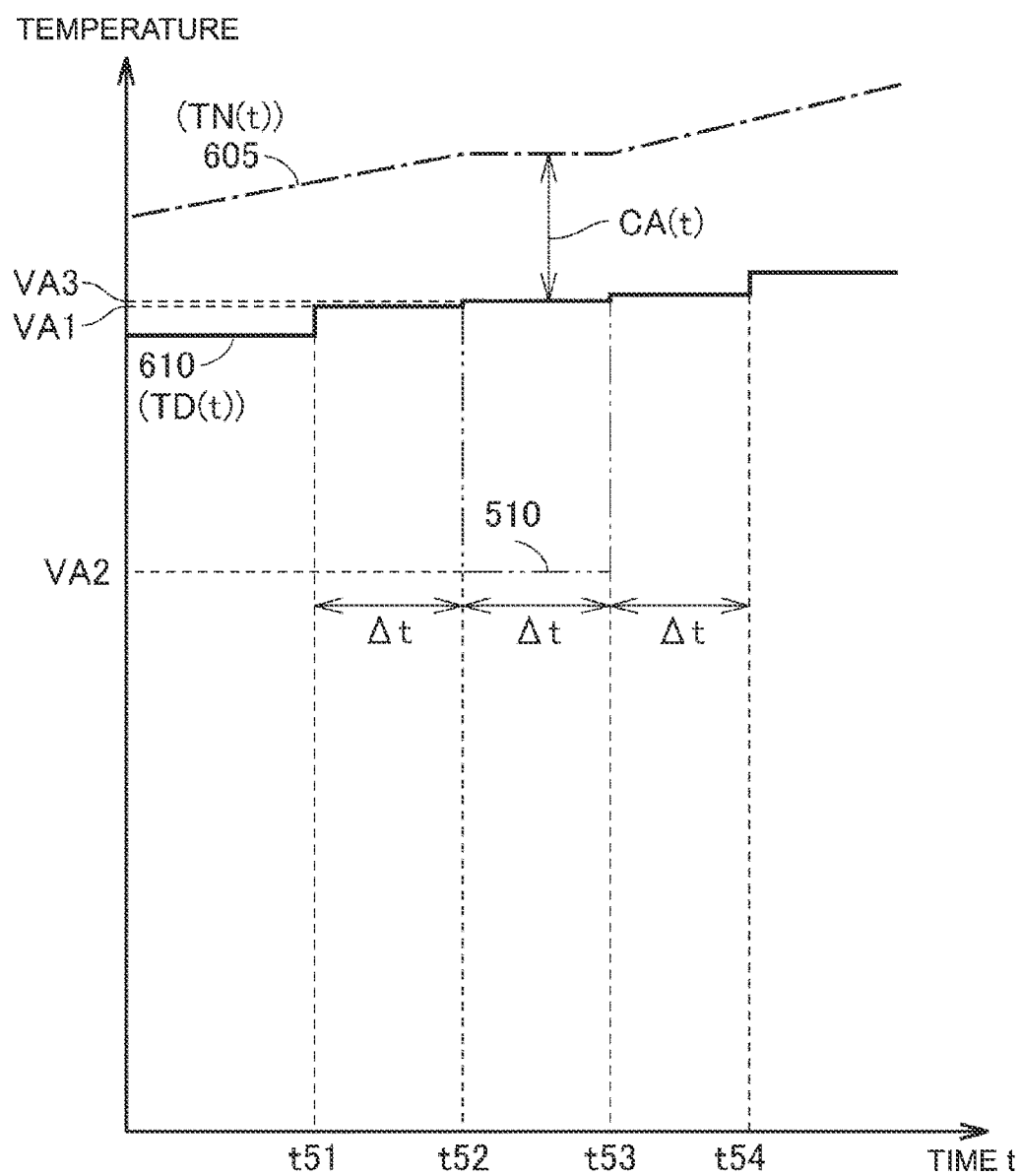
FIG. 15 is a graph showing changes in the detected value of the thermistor and the estimated temperature of the target area, when sampled values of the thermistor include an abnormal value, in a fourth embodiment.

Referring to FIG. 15, a method by which the ECU 100 calculates the detected value TD(t) according to the fourth embodiment will be described. FIG. 15 is a graph showing changes in the detected value TD(t) of the thermistor 80 and the estimated temperature TN(t) of the target area 107 with time, when the sampled values of the thermistor 80 include an absolute value. In FIG. 15, the horizontal axis indicates the time, and the vertical axis indicates the temperature.

Line 605 indicates changes in the estimated temperature TN(t) with time in the fourth embodiment. Line 610 indicates changes in the detected value TD(t) with time in the fourth embodiment.

When the absolute value of the difference between the last value and the current value of the sampled values is equal to or larger than the threshold value, the ECU 100 calculates the detected value TD(t) without using the current value. The ECU 100 uses the threshold value for determining whether the current value is an abnormal value, according to the difference between the last value and the current value. Specifically, the threshold value is suitably determined in advance as an unrealistic value as the amount of change of the sampled value for each sampling period.

During the period from time t51 to time t52, at a point in time when the ECU 100 obtains the current value, the difference between the last value and the current value is assumed to be equal to or larger than the threshold value (i.e., the current value is assumed to be an abnormal value). Thus, the ECU 100 replaces the current value as an abnormal value, with the last value as a normal value. Then, the ECU 100 calculates the average value of the sampled values after the abnormal value is replaced with the normal value, as the detected value TD(t) (line 610). In the example of FIG. 15, the average value is VA3 (≠VA2). The ECU 100 calculates the detected value TD(t) corresponding to the period from time t52 to time t53, according to VA3 as the average value of the sampled values over the period from time t51 to time t52. Then, the ECU 100 sets the temperature correction amount CA(t) for the period from time t52 to time t53, according to the detected value TD(t) thus calculated. As a result, in the example of FIG. 15, the estimated temperature TN(t) during this period is calculated as a value equal to the estimated temperature TN(t) at time t52.

Thus, in the fourth embodiment, unlike the case of the comparative example (line 505 of FIG. 14), the absolute value of the sampled values during the period from time t51 to time t52 is prevented from being reflected by the calculation result of the estimated temperature TN(t) in the next period (the period from time t52 to time t53). As a result, the estimated temperature TN(t) is prevented from suddenly changing at time t52 (line 605).

While the case where the sampled value drops sharply has been described in the example of FIG. 15, the ECU 100 also calculates the detected value TD(t) in substantially the same manner, in the case where the sampled value rises sharply (when the absolute value is significantly larger than the other sampled values). Specifically, the ECU 100 calculates the detected value TD(t) according to the other sampled values, without using the absolute value, sets the temperature correction amount CA(t) according to the detected value TD(t), and calculates the estimated temperature TN(t) of the target area 107.

Figure 16:
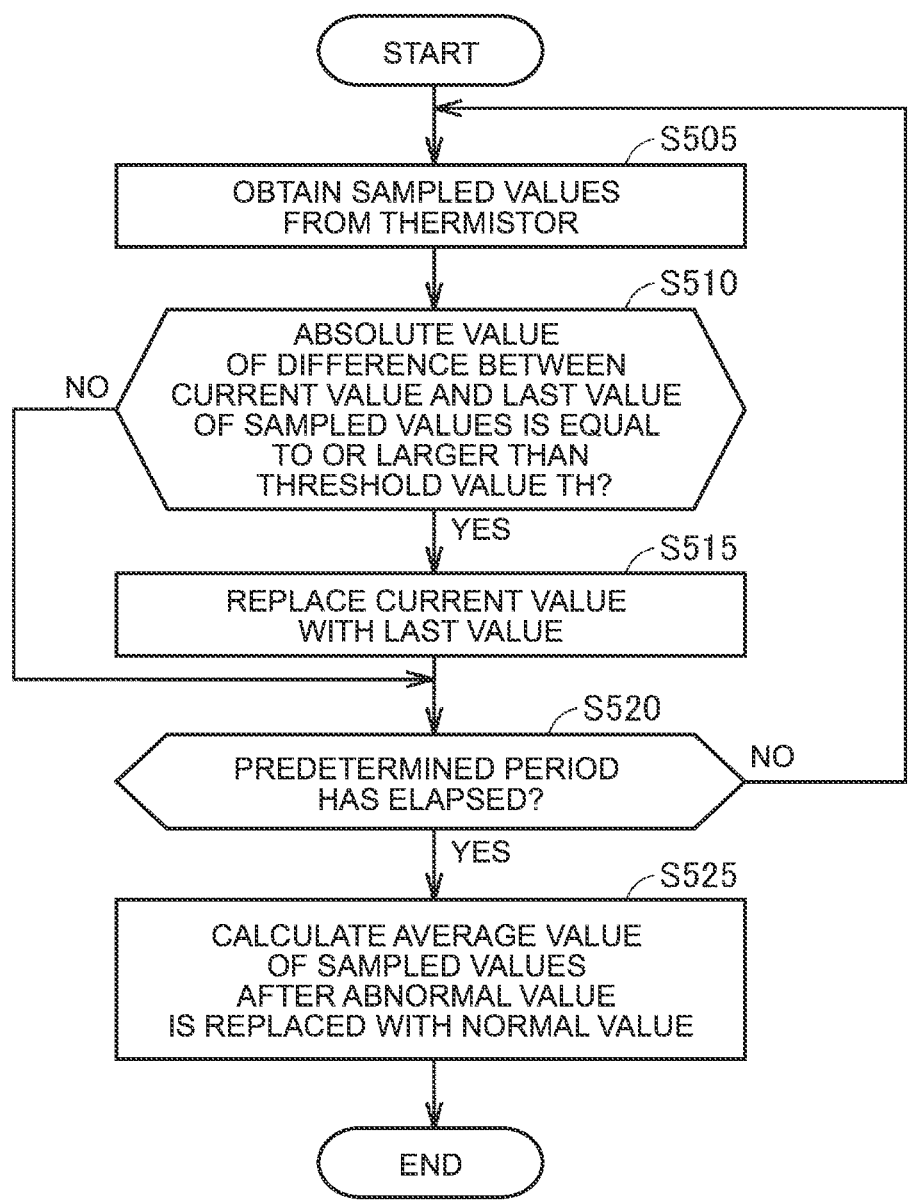
FIG. 16 is a flowchart useful for describing details of a process executed in step S105 of FIG. 6, in a fifth embodiment.

FIG. 16 is a flowchart for describing details of a process performed in step S105 of FIG. 6, in the fifth embodiment.

Referring to FIG. 16, the ECU 100 obtains a sampled value from the thermistor 80 (step S505). The ECU 100 determines whether the absolute value of the difference between the current value and the last value of the sampled values is equal to or larger than the threshold value (step S510). When the absolute value is not equal to nor larger than the threshold value TH (NO in step S510), the ECU 100 proceeds to step S520. When the absolute value is equal to or larger than the threshold value TH (YES in step S510), the ECU 100 determines that the current value of the sampled values is an abnormal value, and replaces the current value of the sampled values with the last value (step S515).

In step S520, the ECU 100 determines whether the predetermined detection period (in the example of FIG. 15, the period having the length of $\Delta t$) has elapsed. When the predetermined detection period has not elapsed (NO in step S520), the ECU 100 return to step S505. When the predetermined detection period has elapsed (YES in step S520), the ECU 100 calculates the average value of the sampled values after the abnormal value is replaced with the normal value (step S525). This average value is used in step S110 and subsequent steps of FIG. 6, as the detected value of the thermistor 80.

As described above, in the fourth embodiment, the ECU 100 determines whether the absolute value of the difference between the last value and the current value of the sampled values obtained from the thermistor 80 is equal to or larger than the threshold value TH. When the absolute value is equal to or larger than the threshold value TH, the ECU 100 determines that the current value is an absolute value, and calculates the detected value TD(t) using the last value (and other normal values in the predetermined detection period), without using the current value.

Thus, even when the current value takes an absolute value such that the absolute value of the difference between the last value and the current value of the sampled values is equal to or larger than the threshold value TH, the detected value TD(t) is calculated without using the current value as the abnormal value. Thus, the abnormal value of the sampled values can be prevented from being reflected by the temperature correction amount CA(t). As a result, the estimated temperature TN(t) of the target area 107 can be prevented from suddenly changing and largely deviating from the actual temperature.

First Modified Example

In each of the above embodiments, the thermistor 80 is installed only on a typical battery module 4 among a plurality of battery modules 4. However, each of the battery modules 4 may be provided with a thermistor. The detection value of each thermistor is obtained by the ECU 100.

In this case, the ECU 100 computes the estimated temperature TN(t) of the target area 107 for each battery module 4. Then, the ECU 100 may make an affirmative decision or a negative decision in step S135 (FIG. 6), depending on whether the average value of seven estimated values of the estimated temperature TN(t) computed with respect to each battery module 4 (or at least one of the estimated values) is equal to or higher than the threshold temperature THT (FIG. 5).

Second Modified Example

In each of the above embodiments, the detected value TD(t) of the thermistor 80 is supposed to be used for calculation of the estimated temperature TN(t) of the target area 107 (neighborhood area) of the thermistor 80.

On the other hand, the detected value TD(t) of the thermistor 80 may be used for estimation of the temperature of an area (another area in the heat generation area 502) other than the target area 107 of the thermistor 80. Namely, as long as the heat conductivity (the amount of heat transfer) between the area where the thermistor 80 is installed and another area where the temperature is estimated, etc. are known, the ECU 100 can calculate the estimated value of the temperature of the other area, using Eq. (1) and Eq. (4).

Other Modified Examples

In the above first through fourth embodiments, the ECU 100 calculates the differential value TDD(t) each time the calculation interval $\Delta t$ (constant value) of the detected value TD(t) of the thermistor 80 elapses, as indicated by Eq. (1) and Eq. (4).

On the other hand, the ECU 100 may perform the operation to calculate the differential value TDD(t), each time the detected value TD(t) of the thermistor 80 changes by a predetermined temperature interval (denoted as $\Delta TI$).

In this case, as $\Delta TI$ is smaller, the differential value TDD(t) is more likely to fluctuate. On the other hand, as $\Delta TI$ is larger, the differential value TDD(t) is less likely to fluctuate, but the number of times it is calculated is reduced, and it takes a longer time for the differential value TDD(t) to be calculated next time. Thus, the ECU 100 may increase the number of times of calculation of the differential value TDD(t), using a method as described below.

Specifically, the ECU 100 executes the process of calculating the differential value TDD(t) "n" times (where "n" is an integer equal to or larger than 2) separately while shifting the start time. For example, the ECU 100 starts a first differential value calculation process. This process is completed at a point in time when the detected value TD(t) of the thermistor 80 has increased by $\Delta T1$ after the start of the process. The differential value in this process is calculated according to the time rate of change between the detected value TD(t) of the thermistor 80 at the start point of the process, and the value to which the detected value TD(t) has increased by $\Delta TI$.

The ECU 100 starts the "m"-th differential value calculation process (where "m" is an integer that satisfies 1≤m≤n), each time the detected value TD(t) of the thermistor 80 increases from the detected value TD(t) at the start of the first differential value calculation process by $\Delta TI \times (m-1)/n$. Each differential value calculation process is completed at the time when the detected value TD(t) of the thermistor 80 increases by $\Delta TI$ from its start.

Thus, after completion of the first differential value calculation process, each time the detected value TD(t) of the thermistor 80 increases by the temperature of $\Delta TI/n$, the corresponding differential value calculation process is completed. Thus, the ECU 100 can obtain the differential value TDD(t) of the detected value TD(t) of the thermistor 80 each time the detected value TD(t) increases by $\Delta TI/n$. As a result, the ECU 100 can increase the number of times the differential value TDD(t) is calculated, to be larger than the case where the process of calculating the differential value TDD(t) is not divided and executed, while preventing the situation where the differential value TDD(t) largely fluctuates. Accordingly, the estimation accuracy of the temperature of the target area 107 can be improved.

The embodiments disclosed herein should be considered as illustrative in all aspects and not restrictive. The scope of the disclosure is indicated by the appended claims, rather than the above description, and is intended to include all changes within the meaning and scope of equivalents to the claims.

What is claimed is:

1. A battery system comprising:
a battery module including a plurality of bipolar nickel-metal-hydride batteries;
a temperature sensor that detects a temperature of a first area in the battery module; and
a processor programmed to calculate an estimated temperature of a second area having a higher temperature than the first area in the battery module, by adding a temperature correction amount to a detected value of the temperature sensor,
wherein the processor is programmed to set the temperature correction amount according to a time differential value of the detected value, and set the temperature correction amount such that a rate of increase of the estimated temperature of the second area does not exceed a predetermined rate that is larger than zero.

2. The battery system according to claim 1, wherein:
the processor is programmed to calculate a first estimated temperature of the second area, by adding a first correction amount of a positive value to the detected value, and calculate a second estimated temperature of the second area, by performing an annealing process for moderating change of the first estimated temperature, on the first estimated temperature;
the processor is programmed to set the first correction amount as the temperature correction amount when the time differential value is a positive value; and
the processor is programmed to set a second correction amount that is larger than zero as the temperature correction amount when the time differential value is reduced from a positive value to a negative value, and calculate the second estimated temperature as the estimated temperature of the second area by adding the second correction amount to the detected value.

3. The battery system according to claim 1, wherein, when the detected value increases from a first value to a second value that is larger than the first value, the processor is programmed to:
calculate a third correction amount obtained by multiplying the time differential value by a predetermined constant;
set the third correction amount as the temperature correction amount at a time when the detected value is the second value, when an amount of increase from a fourth correction amount indicating the temperature correction amount at a time when the detected value is the first value to the third correction amount is smaller than a threshold amount; and
set a value obtained by adding a value that is smaller than the threshold amount to the fourth correction amount, as the temperature correction amount at the time when the detected value is the second value, when the amount of increase is equal to or larger than the threshold amount.

4. The battery system according to claim 1, wherein the processor is programmed to:
obtain a sampled value of an output of the temperature sensor every sampling period;
calculate the detected value for each predetermined period, using a plurality of sampled values over the predetermined period that is longer than the sampling period;
calculate the estimated temperature of the second area from the detected value, for the each predetermined period; and
when an absolute value of a difference between a last value and a current value of the sampled values is equal to or larger than a threshold value, calculate the detected value without using the current value.

5. The battery system according to claim 4, wherein the processor is programmed to calculate an average value of the sampled values as the detected value.

6. The battery system according to claim 1, wherein the processor is programmed to set the temperature correction amount such that the rate of increase of the estimated temperature of the second area does not exceed the predetermined rate, when a charging current of the battery module is equal to or larger than a predetermined threshold current.

7. The battery system according to claim 1, further comprising a relay connected to the battery module,
wherein the processor is programmed to control the relay to an open state when the estimated temperature of the second area is increased to a threshold temperature.

8. The battery system according to claim 7, wherein the relay is configured to switch between execution and stop of charging and discharging in the battery module.

* * * * *